US012735589B2

(12) United States Patent
Sato et al.

(10) Patent No.: US 12,735,589 B2
(45) Date of Patent: Sep. 15, 2026

(54) INK JET INK, INK SET, IMAGE RECORDING METHOD, AND METHOD OF PRODUCING LAMINATE

(71) Applicant: FUJIFILM Corporation, Tokyo (JP)

(72) Inventors: Ayato Sato, Kanagawa (JP); Toshihiro Kariya, Kanagawa (JP); Takeshi Miyato, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 178 days.

(21) Appl. No.: 18/588,456

(22) Filed: Feb. 27, 2024

(65) Prior Publication Data

US 2024/0199900 A1 Jun. 20, 2024

Related U.S. Application Data

(63) Continuation of application No. PCT/JP2022/030840, filed on Aug. 15, 2022.

(30) Foreign Application Priority Data

Sep. 7, 2021 (JP) ................................ 2021-145667

(51) Int. Cl.
*C09D 11/322* (2014.01)
*B41J 2/01* (2006.01)
(Continued)

(52) U.S. Cl.
CPC ............... *C09D 11/322* (2013.01); *B41J 2/01* (2013.01); *B41J 2/21* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2018/0187033 A1* 7/2018 Sugihara .............. C09D 11/322
2018/0282564 A1* 10/2018 Matsuzaki ............ C09D 11/54
(Continued)

FOREIGN PATENT DOCUMENTS

EP 2781565 A1 9/2014
EP 3778797 A1 2/2021
(Continued)

OTHER PUBLICATIONS

Extended European Search Report issued Apr. 14, 2025 in Application No. 22867147.5.
(Continued)

*Primary Examiner* — Manish S Shah
(74) *Attorney, Agent, or Firm* — Sughrue Mion, PLLC

(57) ABSTRACT

Provided are an ink jet ink capable of recording an image with excellent adhesiveness to a base material or the like (for example, lamination strength between an image and a base material for lamination which is disposed on an image surface of an image recorded material), and applications thereof. The ink jet ink contains water, a white pigment, and at least two kinds of resins, and the ink jet ink has an acid value of 8.0 mgKOH/g or less.

17 Claims, 1 Drawing Sheet

(51) Int. Cl.

| | |
|---|---|
| ***B41J 2/21*** | (2006.01) |
| ***B41M 5/00*** | (2006.01) |
| ***C09D 11/102*** | (2014.01) |
| ***C09D 11/107*** | (2014.01) |
| ***C09D 11/40*** | (2014.01) |
| ***C09D 11/54*** | (2014.01) |

(52) U.S. Cl.
CPC ............. *B41M 5/00* (2013.01); *C09D 11/102* (2013.01); *C09D 11/107* (2013.01); *C09D 11/40* (2013.01); *C09D 11/54* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108

See application file for complete search history.

(56) References Cited

U.S. PATENT DOCUMENTS

| | | | | |
|---|---|---|---|---|
| 2019/0023922 | A1* | 1/2019 | Koyama | C09D 11/38 |
| 2020/0157370 | A1* | 5/2020 | Okamoto | B41J 2/01 |
| 2020/0207996 | A1* | 7/2020 | Yatake | B41J 11/0022 |
| 2021/0002502 | A1* | 1/2021 | Kawai | B41J 2/01 |
| 2021/0062027 | A1* | 3/2021 | Watanabe | B41J 2/2107 |
| 2021/0108100 | A1* | 4/2021 | Nishimura | B41J 2/01 |
| 2021/0179873 | A1 | 6/2021 | Fujita | |
| 2021/0403735 | A1* | 12/2021 | Sato | B41J 2/01 |

FOREIGN PATENT DOCUMENTS

| | | | |
|---|---|---|---|
| JP | 2011-105915 | A | 6/2011 |
| JP | 2013-82885 | A | 5/2013 |
| JP | 2017-190370 | A | 10/2017 |
| JP | 2018-165314 | A | 10/2018 |
| JP | 2020-033635 | A | 3/2020 |
| JP | 2021-91822 | A | 6/2021 |
| JP | 6894560 | B1 | 6/2021 |
| WO | 2005/085371 | A1 | 9/2005 |
| WO | 2013/008691 | A1 | 1/2013 |

OTHER PUBLICATIONS

Office Action issued Jul. 11, 2025 in Chinese Patent Application No. 202280059094.2.

International Preliminary Report on Patentability issued Mar. 5, 2024 with a Translation of the Written Opinion of the International Searching Authority in Application No. PCT/JP2022/030840.

Written Opinion of the International Searching Authority Dated Oct. 11, 2022 in International Application No. PCT/JP2022/030840.

International Search Report dated Oct. 11, 2022 in Application No. PCT/JP2022/030840.

Communication dated Jan. 27, 2026 in Japanese Application No. 2023-546852.

Communication dated Jun. 9, 2026, issued in Japanese Application No. 2023-546852.

* cited by examiner

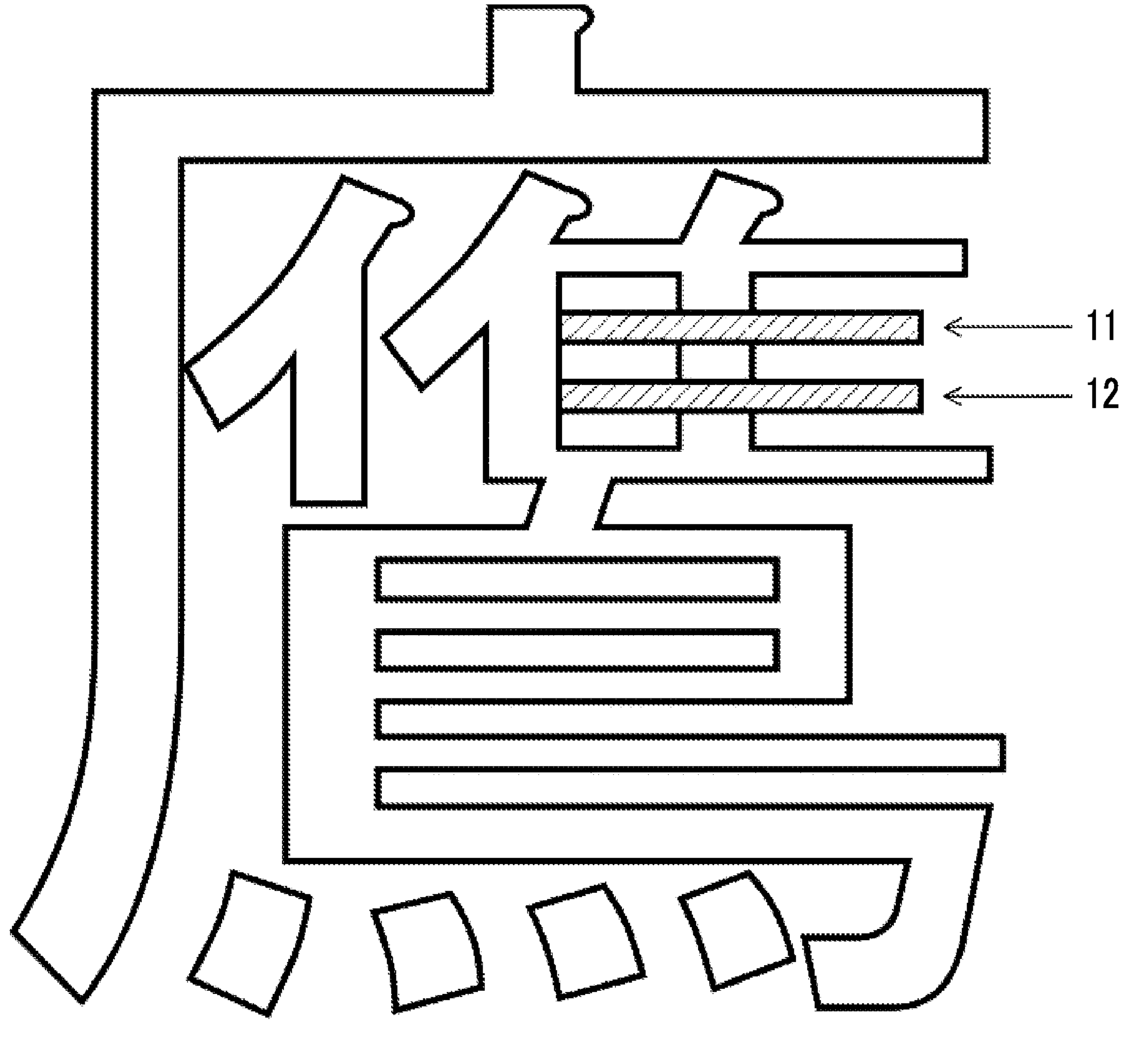
11
12

INK JET INK, INK SET, IMAGE RECORDING METHOD, AND METHOD OF PRODUCING LAMINATE

CROSS-REFERENCE TO RELATED APPLICATION

This application is a Continuation of International Application No. PCT/JP2022/030840, filed Aug. 15, 2022, which claims priority to Japanese Patent Application No. 2021-145667 filed Sep. 7, 2021. Each of the above applications is hereby expressly incorporated by reference, in its entirety, into the present application.

BACKGROUND OF THE INVENTION

1. Field of the Invention

The present disclosure relates to an ink jet ink, an ink set, an image recording method, and a method of producing a laminate.

2. Description of the Related Art

In the related art, various examinations have been conducted on image recording carried out using an ink.

For example, JP2021-91822A describes an ink composition containing resin particles and amino alcohols, in which a resin of the resin particles has an acid value of 10 mgKOH/g or less, the amino alcohols have a standard boiling point of 320° C. or lower, the ink composition contains a pigment or no pigment as a coloring material, and a total content of the resin particles and the pigment is 17% by mass or less with respect to a total mass of the ink composition. JP2018-165314A describes an aqueous ink jet ink composition containing resin fine particles, a nonionic surfactant, a resin-soluble solvent, and water, in which a total acid value amount of an acid value amount of the resin fine particles in the aqueous ink jet ink composition and an acid value amount of a dispersing agent resin in a case where the aqueous ink jet ink composition contains a dispersing agent resin is 200 mgKOH/100 g or less. JP2017-190370A discloses an ink jet ink composition containing a coloring material, water, an organic solvent, and resin particles, in which the resin particles contain a resin having an elastic modulus of 400 MPa or greater and 1000 MPa or less, and a total content of pyrrolidones and glycol monoethers in the organic solvent is 1.5% by mass or less with respect to a total amount of the ink jet ink composition.

SUMMARY OF THE INVENTION

An image to be recorded is required to have adhesiveness to various base materials depending on the usage aspect.

A laminate may be produced by recording an image on a base material to obtain an image recorded material and laminating a base material for lamination on the image in the image recorded material. Further, the image recorded material and the base material for lamination are required to have improved lamination strength.

The present disclosure has been made in consideration of the above-described circumstances, and an object to be achieved by an embodiment of the present disclosure is to provide an ink jet ink, an ink set, and an image recording method, which enable recording of an image with excellent adhesiveness to a base material or the like (for example, lamination strength between an image and a base material for lamination which is disposed on an image surface of an image recorded material).

An object to be achieved by another embodiment of the present disclosure is to provide a method of producing a laminate, which enables production of a laminate with excellent lamination strength between a base material for lamination and an image recorded material.

The present disclosure includes the following aspects.

<1>

An ink jet ink comprising: water; a white pigment; and at least two kinds of resins, in which the ink jet ink has an acid value of 8.0 mgKOH/g or less.

<2>

The ink jet ink according to <1>, in which the ink jet ink has an acid value of 1.5 mgKOH/g to 4.0 mgKOH/g.

<3>

The ink jet ink according to <1> or <2>, in which an ink film formed by solidifying the ink jet ink has an elastic modulus of 2.5 GPa to 5.0 GPa.

<4>

The ink jet ink according to any one of <1> to <3>, in which at least one resin of the at least two kinds of resins has an acid value of 40 mgKOH/g or less.

<5>

The ink jet ink according to any one of <1> to <4>, in which at least one resin of the at least two kinds of resins is present as resin particles.

<6>

The ink jet ink according to <5>, in which a content of the resin particles is in a range of 3% by mass to 8% by mass with respect to a total amount of the ink jet ink.

<7>

An ink set comprising: a first ink which is the ink jet ink according to any one of <1> to <6>; and a second ink which is an ink jet ink containing water, a pigment other than a white pigment, and a resin.

<8>

The ink set according to <7>, in which the second ink has an acid value of 8.0 mgKOH/g or less.

<9>

The ink set according to <7>, in which the second ink has an acid value of 1.0 mgKOH/g to 5.0 mgKOH/g.

<10>

The ink set according to any one of <7> to <9>, in which an absolute value of a difference between the acid value of the first ink and an acid value of the second ink is 2.0 mgKOH/g or less.

<11>

The ink set according to any one of <7> to <10>, in which an ink film formed by solidifying the second ink has an elastic modulus of 2.5 GPa to 5.0 GPa.

<12>

The ink set according to any one of <7> to <11>, further comprising: a pretreatment liquid containing water and a resin.

<13>

The ink set according to <12>, in which an elastic modulus of a pretreatment liquid film formed by solidifying the pretreatment liquid is the same as or less than an elastic modulus of the ink film formed by solidifying the second ink.

<14>

An image recording method using the ink jet ink according to any one of <1> to <6>, the method comprising: a step of applying the ink jet ink onto a base material using an ink jet recording method.

<15>

An image recording method using the ink set according to any one of <7> to <11>, the method comprising: a step of applying the first ink and the second ink onto a base material using an ink jet recording method.

<16>

An image recording method using the ink set according to <12> or <13>, the method comprising: a step of applying the pretreatment liquid onto a base material; and a step of applying the first ink and the second ink onto the base material onto which the pretreatment liquid has been applied, using an ink jet recording method.

<17>

A method of producing a laminate comprising: a step of obtaining an image recorded material which includes the base material and an image disposed on the base material using the image recording method according to any one of <14> to <16>; and a step of laminating a base material for lamination on a side of the image recorded material where the image is disposed to obtain a laminate.

According to an embodiment of the present disclosure, it is possible to provide an ink jet ink, an ink set, and an image recording method, which enable recording of an image with excellent adhesiveness to a base material or the like (for example, lamination strength between an image and a base material for lamination which is disposed on an image surface of an image recorded material).

According to another embodiment of the present disclosure, it is possible to provide a method of producing a laminate, which enables production of a laminate with excellent lamination strength between a base material for lamination and an image recorded material.

BRIEF DESCRIPTION OF THE DRAWINGS

FIG. 1 is a view for describing the details of evaluation standards for the character quality in examples.

DESCRIPTION OF THE PREFERRED EMBODIMENTS

Hereinafter, an ink jet ink, an ink set, an image recording method, and a method of producing a laminate according to the present disclosure will be described in detail.

In the present specification, a numerical range shown using "to" indicates a range including the numerical values described before and after "to" as a minimum value and a maximum value, respectively.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in a certain numerical range may be replaced with a value described in an example.

In the present specification, in a case where a plurality of substances corresponding to respective components in a composition are present, the amount of the respective components in the composition indicates the total amount of the plurality of substances present in the composition unless otherwise specified.

In the present specification, a combination of two or more preferred embodiments is a more preferred embodiment.

In the present specification, the meaning of the term "step" includes not only an independent step but also a step whose intended purpose is achieved even in a case where the step is not clearly distinguished from other steps.

In the present specification, the term "image" denotes an entire film formed by applying a pretreatment liquid and an ink in this order, and the term "image recording" denotes formation of an image (that is, the film).

Further, the concept of "image" in the present specification also includes a solid image.

In the present specification, the concept of "(meth)acrylate" includes both acrylate and methacrylate. In addition, the concept of "(meth)acryl" includes both acryl and methacryl.

[Ink Jet Ink]

An ink jet ink of the present disclosure (hereinafter, also simply referred to as "ink") contains water, a white pigment, and at least two kinds of resins, and the ink jet ink has an acid value of 8.0 mgKOH/g or less.

According to the ink of the present disclosure, an image recorded with the ink has excellent adhesiveness to a base material or the like. Particularly, in an aspect of disposing a base material for lamination on an image surface of an image recorded material, in a case where the base material for lamination is laminated on an image recorded with the ink, the lamination strength between the image and the base material for lamination is excellent.

Here, the lamination strength denotes peel strength in a case of peeling the base material for lamination and the image recorded material from the laminate formed by lamination [that is, the laminate having a laminated structure of "base material for lamination/image recorded material" (specifically, a laminated structure of "base material for lamination/image/base material")].

The reason why the above-described effects are exhibited by the ink of the present disclosure is assumed as follows.

In a case where the ink of the present disclosure has an acid value of 8.0 mgKOH/g or less, the adhesiveness of a recorded image to a base material or the like is excellent. In a case of a laminate in which a base material for lamination is disposed on an image surface of the image recorded material, the adhesiveness between an ink layer formed by the ink and the base material for lamination is required to be improved in order to improve the lamination strength in the laminate.

It is assumed that in a case where the ink of the present disclosure has an acid value of 8.0 mgKOH/g or less, the adhesiveness between the ink layer and the base material for lamination is improved, and thus the lamination strength is improved.

Meanwhile, JP2021-91822A, JP2018-165314A, and JP2017-190370A have not paid attention to the acid value of the ink containing a white pigment.

Hereinafter, each component contained in the ink of the present disclosure will be described in detail.

(White Pigment)

The ink of the present disclosure contains a white pigment. The ink may contain only one or two or more kinds of white pigments.

Examples of the white pigment include titanium dioxide, barium sulfate, calcium carbonate, silica, zinc oxide, zinc sulfide, mica, talc, and pearl.

Among these, the white pigment is preferably titanium dioxide, barium sulfate, calcium carbonate, or zinc oxide and more preferably titanium dioxide.

From the viewpoint of the covering property, the average primary particle diameter of the white pigment is preferably 150 nm or greater and more preferably 200 nm or greater. Further, from the viewpoint of the jettability of the ink, the average primary particle diameter of the white pigment is preferably 400 nm or less and more preferably 350 nm or less.

In the present disclosure, the average primary particle diameter of the white pigment is a value measured using a transmission electron microscope (TEM). Specifically, the average primary particle diameter of the white pigment is a value determined by selecting 50 optional particles of the white pigment present in a visual field observed by a TEM, measuring the primary particle diameters of 50 particles, and averaging the measured diameters. As the transmission electron microscope, a transmission electron microscope 1200EX (manufactured by JEOL Ltd.) can be used.

From the viewpoints of the image density and the jettability of the ink, the content of the white pigment in the ink is preferably in a range of 5% by mass to 25% by mass and more preferably in a range of 10% by mass to 20% by mass with respect to the total amount of the ink.

(Resin)

The ink of the present disclosure contains at least two kinds of resins. The ink may contain two or three or more kinds of resins.

The resin may be a dispersing agent having a function of dispersing the white pigment or may be a resin added to the ink separately from the dispersing agent. Hereinafter, the resin that functions as a dispersing agent will also be referred to as “dispersing resin”. Further, a resin other than the resin that functions as a dispersing agent will also be referred to as “additive resin”. The at least two kinds of resins may be at least two kinds of dispersing resins, at least one kind of dispersing resin and at least one kind of additive resin, or at least two kinds of additive resins.

From the viewpoint of improving the adhesiveness between the base material and the image, it is preferable that the at least two kinds of resins are at least one kind of dispersing resin and at least one kind of additive resin. As described below, it is preferable that the additive resin is present in the form of resin particles from the viewpoint of improving the lamination strength of the image recorded material. Therefore, in the ink of the present disclosure, it is preferable that the at least two kinds of resins are at least one kind of dispersing resin and at least one kind of resin particles.

The kind of the resin is not particularly limited, and examples thereof include an acrylic resin, an epoxy resin, a urethane resin, polyether, polyamide, a phenol resin, a silicone resin, a fluororesin, a vinyl resin (such as a vinyl chloride resin, a vinyl acetate-based resin, a vinyl alcohol-based resin, or a vinyl butyral-based resin), an alkyd resin, a polyester resin, a melamine resin, a melamine formaldehyde resin, an aminoalkyd cocondensation resin, and a urea resin. Among these, from the viewpoint of improving the adhesiveness of the image to the base material or the like (particularly, the lamination strength between the image and the base material for lamination), an acrylic resin is preferable as the resin.

In the present disclosure, the acrylic resin denotes a polymer having a structural unit derived from a (meth) acrylic compound containing an acryloyl group ($CH_2$=CH—C(=O)—) or a methacryloyl group ($CH_2$=C($CH_3$)—C(=O)—). Examples of the (meth)acrylic compound include (meth)acrylic acid, (meth)acrylic acid ester, and (meth)acrylamide. Examples of the structural unit other than the structural unit derived from the (meth)acrylic compound in the acrylic resin include a structural unit derived from styrene. A styrene acrylic resin is included in the acrylic resin.

From the viewpoint of the jettability, the total content of the resin in the ink is preferably 30% by mass or less, more preferably 20% by mass or less, and still more preferably 10% by mass or less with respect to the total amount of the ink. The lower limit of the content of the resin is not particularly limited, and is, for example, 0.1% by mass.

From the viewpoint of setting the acid value of the ink to 8 mgKOH/g or less, at least one resin of the at least two kinds of resins contained in the ink has an acid value of preferably 90 mgKOH/g or less, more preferably 60 mgKOH/g or less, still more preferably 40 mgKOH/g or less, and particularly preferably 20 mgKOH/g or less. The lower limit of the acid value thereof is not particularly limited, and may be 0 mgKOH/g. The acid value of the resin particles contained in the ink is preferably 1 mgKOH/g or greater and more preferably 2 mgKOH/g or greater.

In the present disclosure, the acid value is a value measured by the method described in JIS K 0070: 1992.

—Resin Functioning as Dispersing Agent (Dispersing Resin)—

A dispersing resin is typically contained in a pigment dispersion liquid by being mixed with a pigment in advance. The dispersing resin may be appropriately selected from known dispersing agents of the related art, and may be a random copolymer or a block copolymer. Further, the dispersing resin may have a crosslinking structure.

Among these, it is preferable that the dispersing resin is a random copolymer.

It is preferable that the random copolymer has a structural unit derived from a hydrophobic monomer and a structural unit derived from a monomer containing an anionic group (hereinafter, referred to as “anionic group-containing monomer”). From the viewpoint of dispersion stability, the content ratio (a:b) of a structural unit a derived from a hydrophobic monomer to a structural unit b derived from an anionic group-containing monomer is preferably in a range of 8:1 to 1:1.

The structural unit contained in the random copolymer and derived from a hydrophobic monomer may be used alone or two or more kinds thereof.

The structural unit contained in the random copolymer and derived from an anionic group-containing monomer may be used alone or two or more kinds thereof.

The hydrophobic monomer includes preferably a monomer containing a hydrocarbon group having 4 or more carbon atoms, more preferably an ethylene unsaturated monomer containing a hydrocarbon group having 4 or more carbon atoms, and still more preferably a (meth)acrylate containing a hydrocarbon group having 4 or more carbon atoms. The hydrocarbon group may be any of a chain-like hydrocarbon group, an alicyclic hydrocarbon group, or an aromatic hydrocarbon group. The number of carbon atoms of the hydrocarbon group is more preferably 6 or more and still more preferably 10 or more. The upper limit of the number of carbon atoms of the hydrocarbon group is, for example, 20.

Examples of the (meth)acrylate containing a chain-like hydrocarbon group having 4 or more carbon atoms include n-butyl (meth)acrylate, 2-ethylhexyl (meth)acrylate, octyl (meth)acrylate, lauryl (meth)acrylate, and stearyl (meth) acrylate. The number of carbon atoms in the chain-like hydrocarbon group is preferably 6 or more, more preferably 8 or more, and particularly preferably 12 or more. Among these, it is preferable that the ethylene unsaturated monomer containing a chain-like hydrocarbon group having 4 or more carbon atoms is lauryl (meth)acrylate or stearyl (meth) acrylate.

Examples of the (meth)acrylate containing an alicyclic hydrocarbon group having 4 or more carbon atoms include (bicyclo[2.2.1]heptyl-2) (meth)acrylate, 1-adamantyl (meth) acrylate, 2-adamantyl (meth)acrylate, 3-methyl-1-adamantyl (meth)acrylate, 3,5-dimethyl-1-adamantyl (meth)acrylate, 3-ethyladamantyl (meth)acrylate, 3-methyl-5-ethyl-1-adamantyl (meth)acrylate, 3,5,8-triethyl-1-adamantyl (meth)acrylate, 3,5-dimethyl-8-ethyl-1-adamantyl (meth) acrylate, 2-methyl-2-adamantyl (meth)acrylate, 2-ethyl-2-adamantyl (meth)acrylate, 3-hydroxy-1-adamantyl (meth) acrylate, octahydro-4,7-methanoinden-5-yl (meth)acrylate, octahydro-4,7-methanoinden-1-ylmethyl (meth)acrylate, 1-methyl (meth)acrylate, tricyclodecane (meth)acrylate, 3-hydroxy-2,6,6-trimethyl-bicyclo[3.1.1]heptyl (meth)acrylate, 3,7,7-trimethyl-4-hydroxy-bicyclo[4.1.0]heptyl (meth) acrylate, (nor)bornyl (meth)acrylate, isobornyl (meth)acrylate, 2,2,5-trimethylcyclohexyl (meth)acrylate, and cyclohexyl (meth)acrylate. The number of carbon atoms of the alicyclic hydrocarbon group is more preferably 6 or more. Among these, it is preferable that the ethylene unsaturated monomer containing an alicyclic hydrocarbon group having 4 or more carbon atoms is isobornyl (meth)acrylate or cyclohexyl (meth)acrylate.

Examples of the (meth)acrylate containing an aromatic hydrocarbon group having 4 or more carbon atoms include 2-naphthyl (meth)acrylate, phenoxyethyl (meth)acrylate, and benzyl (meth)acrylate. Among these, benzyl (meth) acrylate is preferable as the ethylene unsaturated monomer containing an aromatic hydrocarbon group having 4 or more carbon atoms.

The hydrophobic monomer may further contain a (meth) acrylate containing a hydrocarbon group having 1 to 3 carbon atoms.

Examples of the (meth)acrylate containing a hydrocarbon group having 1 to 3 carbon atoms include methyl (meth) acrylate, ethyl (meth)acrylate, n-propyl (meth)acrylate, and hydroxyethyl (meth)acrylate.

Among these, from the viewpoint of improving the dispersion stability of the white pigment, it is preferable that the structural unit contained in the dispersing resin and derived from a hydrophobic monomer includes a structural unit derived from a (meth)acrylate containing a chain-like hydrocarbon group having 4 or more carbon atoms and a structural unit derived from a (meth)acrylate containing an aromatic hydrocarbon group having 4 or more carbon atoms.

Examples of the anionic group in the anionic group-containing monomer include a carboxy group, a salt of the carboxy group, a sulfo group, a salt of the sulfo group, a phosphoric acid group, a salt of the phosphoric acid group, a phosphonic acid group, and a salt of the phosphonic acid group.

Examples of the counterion in a salt include an alkali metal ion such as a sodium ion, a potassium ion, or a lithium ion, an alkaline earth metal ion such as a calcium ion or a magnesium ion, and an ammonium ion.

Among these, a carboxy group or a salt of the carboxy group is preferable as the anionic group.

Examples of the carboxy group-containing monomer include (meth)acrylic acid, β-carboxyethyl acrylate, fumaric acid, itaconic acid, maleic acid, and crotonic acid.

From the viewpoint of the dispersion stability, (meth) acrylic acid or β-carboxyethyl acrylate is preferable, and (meth)acrylic acid is more preferable as the anionic group-containing monomer.

The ratio between the content of the white pigment and the content of the dispersing resin is preferably in a range of 1:0.04 to 1:3, more preferably in a range of 1:0.05 to 1:1, and still more preferably in a range of 1:0.05 to 1:0.5 in terms of the mass.

From the viewpoint of the dispersion stability, the acid value of the dispersing resin is preferably 100 mgKOH/g or greater and more preferably 120 mgKOH/g or greater. Meanwhile, from the viewpoint of setting the acid value of the ink to 8 mgKOH/g or less, the acid value of the dispersing resin is preferably 300 mgKOH/g or less and more preferably 230 mgKOH/g or less.

In a case where the ink contains a dispersing resin as the resin, the content of the dispersing resin is preferably in a range of 0.1% by mass to 10% by mass, more preferably in a range of 0.3% by mass to 5% by mass, and still more preferably in a range of 0.5% by mass to 2.5% by mass with respect to the total amount of the ink.

—Resin Other than Resin Functioning as Dispersing Agent (Additive Resin)—

The ink can be prepared, for example, by adding an additive resin to a pigment dispersion liquid. Examples of the additive resin include a water-soluble resin and a water-insoluble resin. The water-insoluble resin is dispersed in water and is present in the form of resin particles.

In the present disclosure, the term "water-soluble" indicates a property in which 1 g or greater of a substance is dissolved in 100 g of water at 25° C. As the "water-soluble" property, a property in which 3 g or greater (more preferably 10 g or greater) of a substance is dissolved in 100 g of water at 25° C. is preferable.

In the present disclosure, the term "water-insoluble" indicates a property in which less than 1 g of a substance is dissolved in 100 g of water at 25° C. As the "water-insoluble" property, a property in which less than 0.5 g of a substance is dissolved in 100 g of water at 25° C. is preferable.

Among the examples, it is preferable that the additive resin is present in the form of resin particles and that at least one resin among the at least two kinds of resins contained in the ink is present in the form of resin particles. That is, it is preferable that the ink contains resin particles. In a case where the ink contains the resin particles, the strength of the ink film is improved, and the lamination strength of the image recorded material is improved. Here, it is preferable that the resin particles are particles of an acrylic resin or particles of a urethane resin.

The resin particles may contain one or two or more kinds of resins.

The resin contained in the resin particles has preferably an aliphatic ring or an aromatic ring and more preferably an aromatic ring.

The aliphatic ring is preferably an alicyclic hydrocarbon having 5 to 10 carbon atoms and more preferably a cyclohexane ring structure, a dicyclopentanyl ring structure, a dicyclopentenyl ring, or an adamantane ring.

As the aromatic ring, a naphthalene ring or a benzene ring is preferable, and a benzene ring is more preferable.

From the viewpoint of further improving the dispersibility of the resin particles in water, it is preferable that the resin contained in the resin particles contains an ionic group.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The weight-average molecular weight of the resin in the resin particles is preferably in a range of 1,000 to 300,000, more preferably in a range of 2,000 to 200,000, and still more preferably in a range of 5,000 to 100,000.

From the viewpoint of the jetting stability, the average particle diameter of the resin particles is preferably in a range of 1 nm to 200 nm, more preferably in a range of 3 nm to 200 nm, and still more preferably in a range of 5 nm to 50 nm. Further, the average particle diameter of the resin particles is acquired by measuring the volume average particle diameter using a particle size distribution measuring device, for example, "NANOTRAC UPA-EX150" (product name, manufactured by Nikkiso Co., Ltd.) according to a dynamic light scattering method.

From the viewpoint of setting the acid value of the ink to 8 mgKOH/g or less, the acid value of the resin particles is preferably 90 mgKOH/g or less, more preferably 60 mgKOH/g or less, still more preferably 40 mgKOH/g or less, and particularly preferably 20 mgKOH/g or less. The lower limit of the acid value of the resin particles is not particularly limited, but may be 0 mgKOH/g. The acid value of the resin particles contained in the ink is preferably 1 mgKOH/g or greater and more preferably 2 mgKOH/g or greater.

The method of measuring the acid value of the resin particles is the same as the method of measuring the acid value of the dispersing resin described above.

In a case where the ink contains resin particles as the resin, the content of the resin particles is preferably in a range of 2% by mass to 10% by mass and more preferably in a range of 3% by mass to 8% by mass with respect to the total amount of the ink. In a case where the content of the resin particles is 2% by mass or greater, the lamination strength of the image recorded material is improved. Further, in a case where the content of the resin particles is 10% by mass or less, dispersion stability is improved.

(Water)

The ink of the present disclosure contains water. The content of water is not particularly limited and is, for example, in a range of 40% by mass to 70% by mass.

(Organic Solvent)

It is preferable that the ink of the present disclosure contains an organic solvent. The ink may contain one or two or more kinds of organic solvents.

From the viewpoints of the jetting stability and the lamination strength, as the organic solvent, the ink contains preferably an organic solvent having a boiling point of lower than 200° C. and more preferably an organic solvent having a boiling point of 120° C. to 200° C.

The content of the organic solvent having a boiling point of 200° C. or higher is preferably 5% by mass or less, more preferably 2% by mass or less, and still more preferably 0% by mass with respect to the total amount of the ink. That is, it is preferable that the ink does not contain an organic solvent having a boiling point of 200° C. or higher. In a case where the ink contains an organic solvent, it is preferable that the organic solvent is an organic solvent having a boiling point of lower than 200° C.

In a case where the content of the organic solvent having a boiling point of 200° C. or higher is 5% by mass or less, the lamination strength of the image recorded material is improved.

In the present disclosure, "boiling point" denotes a boiling point at 1 atm (101325 Pa). The boiling point is measured by a boiling point meter, and is measured using, for example, a boiling point measuring device (product name: "DosaTherm 300", manufactured by Titan Technologies, K.K.).

Examples of the organic solvent having a boiling point of lower than 200° C. include alkylene glycol such as ethylene glycol (197° C.) or propylene glycol (187° C.); alkylene glycol alkyl ether such as diethylene glycol monomethyl ether (194° C.), diethylene glycol dimethyl ether (162° C.), diethylene glycol ethyl methyl ether (176° C.), diethylene glycol isopropyl methyl ether)(179° C., propylene glycol monomethyl ether (121° C.), propylene glycol monobutyl ether (170° C.), propylene glycol monopropyl ether (150° C.), 3-methoxy-3-methyl-1-butanol (174° C.), propylene glycol monomethyl ether propionate (160° C.), methyl cellosolve (ethylene glycol monomethyl ether, 125° C.), ethyl cellosolve (ethylene glycol monoethyl ether, 135° C.), butyl cellosolve (ethylene glycol monobutyl ether, 171° C.), ethylene glycol-mono-tert-butyl ether (153° C.), or dipropylene glycol monomethyl ether (188° C.); an ester such as ethylene glycol monomethyl ether acetate (145° C.), ethyl acetate (154° C.), ethyl lactate (154° C.), or 3-methoxybutyl acetate (172° C.); and a ketone such as diacetone alcohol)(169° C., cyclohexanone (156° C.), or cyclopentanone (131° C.). Further, the numerical values in parentheses denote the boiling points.

Examples of the organic solvent having a boiling point of 200° C. or higher include alcohol such as 1,3-butanediol (207° C.), 1,4-butanediol (228° C.), benzyl alcohol (205° C.), or terpineol (217° C.); alkylene glycol such as diethylene glycol (244° C.), triethylene glycol (287° C.), or dipropylene glycol(230° C.); alkylene glycol alkyl ether such as diethylene glycol monoethyl ether (202° C.), diethylene glycol monobutyl ether (231° C.), triethylene glycol monomethyl ether)(249° C., triethylene glycol dimethyl ether (216° C.), diethylene glycol monohexyl ether (261° C. or higher), or tripropylene glycol monomethyl ether (243° C.); and an ester such as diethylene glycol monoethyl ether acetate (217° C.). Further, the numerical values in parentheses denote the boiling points.

The content of the organic solvent in the ink is preferably in a range of 5% by mass to 40% by mass and more preferably in a range of 10% by mass to 30% by mass with respect to the total amount of the ink.

(Additive)

The ink may contain additives such as a surfactant, a co-sensitizer, an ultraviolet absorbing agent, an antioxidant, a fading inhibitor, a conductive salt, and a basic compound, as necessary.

(Physical Properties)

The ink of the present disclosure has an acid value of 8 mgKOH/g or less and more preferably 1.5 mgKOH/g to 4.0 mgKOH/g. Since the acid value of the ink is 8 mgKOH/g or less, the lamination strength is excellent.

It is considered that in a case where the acid value of the ink is 8 mgKOH/g or less, an adhesive used in a case of laminating an image recorded material and the base material for lamination is likely to permeate, and thus the lamination strength is improved.

The acid value of the ink is a value measured by the method described in JIS K 0070:1992.

In a case where the ink contains a dispersing resin and an additive resin, the acid value of the ink can be calculated by the following equation using the acid value and the content of the dispersing resin and the acid value and the content of the additive resin.

$$\text{Acid value of ink}=(\text{acid value of dispersing resin}\times\text{content of dispersing resin})/100+(\text{acid value of additive resin}\times\text{content of additive resin})/100$$

In the ink of the present disclosure, the elastic modulus of the ink film formed by solidifying the ink is preferably in a range of 2.5 GPa to 5.0 GPa and more preferably in a range of 2.5 GPa to 4.0 GPa. In a case where the elastic modulus of the ink film is 2.5 GPa or greater, the stress concentration on the interface of the ink film is relaxed, and thus the lamination strength of the image recorded material is further improved. Meanwhile, in a case where the elastic modulus of the ink film is 5.0 GPa or less, the stress concentration on the inside of the ink film is relaxed, the lamination strength of the image recorded material is further improved.

The ink film formed by solidification denotes a film in a state where water and an organic solvent contained in the ink have evaporated after application of the ink onto the base material.

In the present disclosure, the clastic modulus of the ink film is a value measured by a nanoindentation method. A nanotriboindenter TI-950 (manufactured by Hysitron, Inc.) can be used as a measuring device. The clastic modulus is measured at an indentation depth of 500 nm using a cube corner indenter as an indenter for nanoindentation.

From the viewpoint of improving the jetting stability, the pH of the ink is preferably in a range of 7 to 10 and more preferably in a range of 7.5 to 9.5. The pH is measured at 25° C. using a pH meter, for example, a pH meter (model number "HM-31", manufactured by DKK-Toa Corporation).

The viscosity of the ink is preferably in a range of 0.5 mPa·s to 30 mPa·s, more preferably in a range of 2 mPa·s to 20 mPa·s, still more preferably in a range of 2 mPa·s to 15 mPa·s, and still more preferably in a range of 3 mPa·s to 10 mPa·s. The viscosity is measured at 25° C. using a viscometer, for example, a TV-22 type viscometer (manufactured by Toki Sangyo Co., Ltd.).

The surface tension of the ink is preferably 60 mN/m or less, more preferably in a range of 20 mN/m to 50 mN/m, and still more preferably in a range of 30 mN/m to 45 mN/m. The surface tension is measured at 25° C. by a plate method using a surface tension meter, for example, an automatic surface tension meter (product name, "CBVP-Z", manufactured by Kyowa Interface Science Co., Ltd.).

[Ink Set]

It is preferable that the ink set of the present disclosure contains a first ink that is the ink of the present disclosure and a second ink that is an ink jet ink containing water, a pigment other than a white pigment, and a resin. Since the details of the first ink are the same as those of the above-described ink, the description thereof will not be repeated.

—Second Ink—

The second ink contains water, a pigment other than a white pigment, and a resin and may further contain other components.

(Pigment Other than White Pigment)

The second ink contains a pigment (hereinafter, also referred to as "color pigment") other than a white pigment. The second ink may contain one or two or more kinds of color pigments.

The color pigment may be any of an organic pigment or an inorganic pigment that is typically commercially available. Examples of the color pigment include pigments described in "Encyclopedia of Pigments" edited by Seishiro Ito (2000), "Industrial Organic Pigments", W. Herbst, K. Hunger, JP2002-12607A, JP2002-188025A, JP2003-26978A, and JP2003-342503A.

Further, the color pigment may be a water-insoluble pigment that can be dispersed in water by a dispersing agent, or may be a self-dispersing pigment. The self-dispersing pigment is a pigment that can be dispersed in water without using a dispersing agent. The self-dispersing pigment is, for example, a compound in which at least one selected from the group consisting of hydrophilic groups such as a carbonyl group, a hydroxyl group, a carboxyl group, a sulfo group, and a phosphoric acid group and salts thereof is chemically bonded to a surface of a pigment directly or via another group.

The kind of the color pigment is not particularly limited, and examples thereof include a cyan pigment, a magenta pigment, a yellow pigment, and a black pigment.

From the viewpoints of the image density and the jettability of the ink, the content of the color pigment in the ink is preferably in a range of 1% by mass to 20% by mass, more preferably in a range of 1% by mass to 15% by mass, and still more preferably in a range of 1% by mass to 10% by mass with respect to the total amount of the second ink.

(Resin)

The resin may be a dispersing agent having a function of dispersing the color pigment or may be a resin added to the ink separately from the dispersing agent. Therefore, the ink may contain only a dispersing resin or may contain a dispersing resin and an additive resin. Further, in a case where the color pigment is a self-dispersing pigment, the ink may contain only an additive resin without containing a dispersing agent.

From the viewpoint of improving the adhesiveness between the base material and the image, it is preferable that the second ink contains two or more kinds of resins and preferable that the two or more kinds of resins include a dispersing resin and an additive resin.

The kind of the resin contained in the second ink is not particularly limited, and examples thereof include the same resins as those contained in the ink (the first ink) described above.

From the viewpoint of the jettability, the content of the resin in the second ink is preferably 30% by mass or less, more preferably 20% by mass or less, and still more preferably 10% by mass or less with respect to the total amount of the second ink. The lower limit of the content of the resin is not particularly limited, and is, for example, 0.1% by mass.

—Resin Functioning as Dispersing Agent (Dispersing Resin)—

A dispersing resin is typically contained in a pigment dispersion liquid by being mixed with a pigment in advance. The dispersing resin may be appropriately selected from known dispersing agents of the related art, and may be a random copolymer or a block copolymer. Further, the dispersing resin may have a crosslinking structure.

Among the examples, it is preferable that the dispersing resin contained in the second ink is a random copolymer. Specific examples of the dispersing resin contained in the second ink are the same as the specific examples of the dispersing resin contained in the ink (first ink).

From the viewpoint of improving the dispersion stability of the color pigment, it is preferable that the structural unit contained in the dispersing resin of the second ink and derived from a hydrophobic monomer includes a structural unit derived from a (meth)acrylate containing an aromatic hydrocarbon group having 4 or more carbon atoms.

The ratio of the content of the color pigment to the content of the dispersing resin is preferably in a range of 1:0.04 to 1:3, more preferably in a range of 1:0.05 to 1:1, and still more preferably in a range of 1:0.05 to 1:0.5 in terms of the mass.

From the viewpoint of the dispersion stability, the acid value of the dispersing resin is preferably 80 mgKOH/g or greater and more preferably 100 mgKOH/g or greater. Meanwhile, from the viewpoint of setting the acid value of the second ink to 8 mgKOH/g or less, the acid value of the dispersing resin is preferably 250 mgKOH/g or less, more preferably 200 mgKOH/g or less, and still more preferably 150 mgKOH/g or less.

In a case where the second ink contains the dispersing resin as the resin, the content of the dispersing resin is preferably in a range of 0.1% by mass to 10% by mass, more preferably in a range of 0.5% by mass to 8% by mass, and still more preferably in a range of 1% by mass to 5% by mass with respect to the total amount of the second ink.

—Resin Other than Resin Functioning as Dispersing Agent (Additive Resin)—

The second ink can be prepared, for example, by adding an additive resin to a pigment dispersion liquid. Examples of the additive resin include a water-soluble resin and a water-insoluble resin. The water-insoluble resin is dispersed in water and is present in the form of resin particles.

Among these, it is preferable that the second ink contains resin particles. The preferable aspects of the resin particles contained in the second ink are the same as the preferable aspects of the resin particles contained in the ink (first ink).

In a case where the second ink contains resin particles as the resin, the content of the resin particles is preferably in a range of 2% by mass to 10% by mass and more preferably in a range of 3% by mass to 8% by mass with respect to the total amount of the second ink. In a case where the content of the resin particles is 2% by mass or greater, the lamination strength of the image recorded material is improved. Further, in a case where the content of the resin particles is 10% by mass or less, dispersion stability is improved.

(Water)

The second ink contains water. The content of water is not particularly limited and is, for example, in a range of 40% by mass to 70% by mass.

(Organic Solvent)

It is preferable that the second ink contains an organic solvent. The second ink may contain one or two or more kinds of organic solvents. The preferable aspects of the organic solvent contained in the second ink are the same as the preferable aspects of the organic solvent contained in the ink (first ink).

(Additive)

The second ink may contain additives such as a surfactant, a co-sensitizer, an ultraviolet absorbing agent, an antioxidant, a fading inhibitor, a conductive salt, and a basic compound as necessary.

(Physical Properties)

The second ink has an acid value of preferably 8 mgKOH/g or less and more preferably 1.0 mgKOH/g to 5.0 mgKOH/g. In a case where the acid value of the second ink is 8 mgKOH/g or less, the adhesiveness of the image to the base material or the like (particularly, the lamination strength between the image and the base material for lamination) is further improved.

The method of measuring the acid value of the second ink is the same as the method of measuring the acid value of the first ink described above.

From the viewpoint of further improving the lamination strength, the absolute value of the difference between the acid value of the first ink and the acid value of the second ink is preferably 2.0 mgKOH/g or less and more preferably 1.5 mgKOH/g or less. The lower limit of the absolute value of the difference is not particularly limited, but is, for example, 0 mgKOH/g and preferably 0.1 mgKOH/g. The acid value of the first ink may be greater or less than the acid value of the second ink, but it is preferable that the acid value of the first ink is less than the acid value of the second ink.

In a case where the absolute value of the difference between the acid value of the first ink and the acid value of the second ink is 2.0 mgKOH/g or less, the adhesiveness between the ink film formed by the first ink and the ink film formed by the second ink is improved. In this manner, the adhesiveness of the image to the base material or the like (particularly, the lamination strength between the image and the base material for lamination) is considered to be improved.

The ink film formed by solidifying the second ink has an elastic modulus of preferably 2.5 GPa to 5.0 GPa and more preferably 2.5 GPa to 4.0 GPa. In a case where the elastic modulus of the ink film is 2.5 GPa or greater, the stress concentration on the interface of the ink film is relaxed, and thus the adhesiveness of the image recorded material to the base material (particularly, the lamination strength between the image recorded material and the base material for lamination) is further improved. Meanwhile, in a case where the elastic modulus of the ink film is 5.0 GPa or less, the stress concentration on the inside of the ink film is relaxed, and thus the adhesiveness of the image recorded material to the base material (particularly, the lamination strength between the image recorded material and the base material for lamination) is further improved.

From the viewpoint of further improving the lamination strength, the absolute value of the difference between the elastic modulus of the ink film formed by solidifying the first ink and the elastic modulus of the ink film formed by solidifying the second ink is preferably 2.0 GPa or less. The lower limit of the absolute value of the difference is not particularly limited, but is, for example, 0 GPa and preferably 0.1 GPa. The elastic modulus of the first ink film may be greater or less than the elastic modulus of the second ink film, but it is preferable that the elastic modulus of the second ink film is greater than the elastic modulus of the second ink film.

The preferable aspects of the pH, the surface tension, and the viscosity of the second ink are the same as the preferable aspects of the pH, the surface tension, and the viscosity of the ink (first ink).

—Pretreatment Liquid—

It is preferable that the ink set of the present disclosure further contains a pretreatment liquid containing water and a resin. In a case where the ink is applied to the base material onto which the pretreatment liquid has been applied, since the resin contained in the ink and the components in the pretreatment liquid come into contact with each other, the dispersion is destabilized, and thus the ink is thickened. In this manner, the landing interference is suppressed, and thus the image quality is improved.

(Resin)

The pretreatment liquid contains a resin. The pretreatment liquid may contain one or two or more kinds of resins.

The kind of the resin contained in the pretreatment liquid is not particularly limited, and examples of the resin contained in the pretreatment liquid include the same resins exemplified as the resins contained in the ink. Among the examples, the resins contained in the pretreatment liquid include preferably a polyester resin or an acrylic resin and more preferably a polyester resin.

Further, in the present disclosure, the polyester resin indicates a polymer compound having an ester bond in the main chain. Examples of the polyester resin include a polycondensate of polyvalent carboxylic acid (such as dicarboxylic acid) and polyalcohol (such as a diol).

From the viewpoint of improving the image quality (particularly, the character quality), it is preferable that the resin contained in the pretreatment liquid contains resin particles. The kind of the resin particles contained in the pretreatment liquid is not particularly limited, and examples thereof include the same resins exemplified as the resins contained in the ink.

In a case of preparing the pretreatment liquid, a commercially available product of an aqueous dispersion liquid of resin particles may be used.

Examples of the commercially available product of an aqueous dispersion liquid of resin particles include PESRESIN A124GP, PESRESIN A645GH, PESRESIN A615GE, and PESRESIN A520 (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), VYLONAL MD1200 (manufactured by Toyobo Co., Ltd.), and EM57DOC (manufactured by Daicel FineChem Ltd.).

From the viewpoint of the jettability, the content of the resin in the pretreatment liquid is preferably in a range of 5% by mass to 30% by mass, more preferably in a range of 1% by mass to 20% by mass, and particularly preferably in a range of 1% by mass to 15% by mass with respect to the total amount of the pretreatment liquid.

(Water)

The pretreatment liquid contains water. The content of water is not particularly limited and is, for example, in a range of 50% by mass to 90% by mass.

(Aggregating Agent)

From the viewpoint of improving the image quality (particularly, the character quality), it is preferable that the pretreatment liquid contains an aggregating agent. The aggregating agent is not particularly limited as long as the aggregating agent is a component that aggregates the components in the ink. The aggregating agent contains preferably at least one selected from the group consisting of a polyvalent metal compound, an organic acid, a metal complex, and a cationic polymer and more preferably an organic acid.

—Polyvalent Metal Compound—

Examples of the polyvalent metal compound include salts of alkaline earth metals of a group 2 (such as magnesium and calcium) in the periodic table, transition metals of a group 3 (such as lanthanum) in the periodic table, metals of a group 13 (such as aluminum) in the periodic table, and lanthanides (such as neodymium).

As salts of these metals, salts of organic acids, a nitrate, a chloride, and a thiocyanate described below are preferable.

Among these, preferred examples of the polyvalent metal compound include a calcium salt or magnesium salt of an organic acid (such as formic acid, acetic acid, or a benzoic acid), a calcium salt or magnesium salt of nitric acid, calcium chloride, magnesium chloride, and a calcium salt or magnesium salt of thiocyanic acid.

Further, it is preferable that at least a part of the polyvalent metal compound is dissociated into polyvalent metal ions and counterions in the pretreatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

Among these, from the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Examples of the organic compound containing a carboxy group include (meth)acrylic acid, poly(meth)acrylic acid, acetic acid, formic acid, benzoic acid, glycolic acid, malonic acid, malic acid (preferably DL-malic acid), maleic acid, succinic acid, glutaric acid, pimelic acid, adipic acid, fumaric acid, citric acid, tartaric acid, phthalic acid, 4-methylphthalic acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, and nicotinic acid.

Among these, from the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

Specifically, as the polyvalent carboxylic acid, malonic acid, malic acid, maleic acid, succinic acid, glutaric acid, pimelic acid, adipic acid, fumaric acid, tartaric acid, 4-methylphthalic acid, or citric acid is preferable, and malonic acid, malic acid, tartaric acid, succinic acid, glutaric acid, pimelic acid, adipic acid, or citric acid is more preferable.

It is preferable that the organic acid has a low pKa (for example, 1.0 to 5.0). In this manner, the surface charge of particles such as resin particles or the pigment stably dispersed in the ink by a weakly acidic functional group such as a carboxy group can be reduced by bringing the ink into contact with an organic acid having a lower pKa to degrade the dispersion stability.

It is preferable that the organic acid has a low pKa, high solubility in water, and a valence of divalent or higher. Further, it is more preferable that the organic acid has a high buffer capacity in a pH region with a pKa lower than the pKa of a functional group (for example, a carboxy group) that stably disperses particles in the ink.

—Metal Complex—

It is preferable that the metal complex contains at least one selected from the group consisting of zirconium, aluminum, and titanium as a metal element.

As the metal complex, a metal complex including at least one selected from the group consisting of acetate, acetylacetonate, methylacetoacetate, ethylacetoacetate, octylene glycolate, butoxyacetylacetonate, lactate, a lactate ammonium salt, and triethanol aminate as a ligand is preferable.

The metal complex may be a commercially available product. Further, various organic ligands, particularly various multidentate ligands that are capable of forming metal chelate catalysts are commercially available. Accordingly, the metal complex may be a metal complex prepared by combining a commercially available organic ligand with a metal.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable as the metal complex.

—Cationic Polymer—

In addition, the pretreatment liquid may be in a form containing one or two or more kinds of cationic polymers as an aggregating component. It is preferable that the cationic polymer is a homopolymer of a cationic monomer containing a primary to tertiary amino group or a quaternary ammonium base, or a copolymer or a condensed polymer of a cationic monomer and a non-cationic monomer. The cationic polymer may be used in any form of a water-soluble polymer or water-dispersible latex particles.

Examples of the cationic polymer include a polyvinylpyridine salt, polyalkylaminoethyl acrylate, polyalkylaminoethyl methacrylate, polyvinylimidazole, polyethyleneimine, polybiguanide, polyguanide, polyallylamine, and derivatives thereof.

From the viewpoint of the viscosity of the pretreatment liquid, it is preferable that the weight-average molecular weight of the cationic polymer is small. In a case where the pretreatment liquid is applied to a recording medium by an ink jet recording method, the weight-average molecular weight thereof is preferably in a range of 1,000 to 500,000, more preferably in a range of 1,500 to 200,000, and still more preferably in a range of 2,000 to 100,000. It is advantageous that the weight-average molecular weight thereof is 1,000 or greater from the viewpoint of aggregation rate. It is advantageous that the weight-average molecular weight thereof is 500,000 or less from the viewpoint of jetting reliability. However, in a case where the pretreatment liquid is applied to a recording medium by a method other than the ink jet recording method, the weight-average molecular weight thereof is not limited thereto.

The pretreatment liquid may contain only one or two or more kinds of aggregating agents.

The content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

(Organic Solvent)

It is preferable that the pretreatment liquid contains an organic solvent. The pretreatment liquid may contain only one or two or more kinds of organic solvents. The preferable aspects of the organic solvent contained in the pretreatment liquid are the same as the preferable aspects of the organic solvent contained in the ink (first ink).

(Other Components)

The pretreatment liquid may contain other components in addition to the resin and water as necessary. Examples of other components that may be contained in the pretreatment liquid include known additives such as a surfactant, a solid wetting agent, colloidal silica, an inorganic salt, a fading inhibitor, an emulsification stabilizer, a penetration enhancer, an ultraviolet absorbing agent, a preservative, a fungicide, a pH adjuster, a viscosity adjuster, a rust inhibitor, a chelating agent, and a water-soluble polymer compound (for example, water-soluble polymer compounds described in paragraphs 0026 to 0080 of JP2013-001854A).

(Physical Properties)

The pretreatment liquid film formed by solidifying the pretreatment liquid has an elastic modulus of preferably 2.5 GPa to 5.0 GPa and more preferably 2.5 GPa to 4.0 GPa. In a case where the elastic modulus of the pretreatment liquid film is 2.5 GPa or greater, the stress concentration on the interface of the pretreatment liquid film is relaxed, and thus the lamination strength of the image recorded material is further improved. Meanwhile, in a case where the elastic modulus of the pretreatment liquid film is 5.0 GPa or less, the stress concentration on the inside of the pretreatment liquid film is relaxed, the lamination strength of the image recorded material is further improved.

From the viewpoint of further improving the lamination strength of the image recorded material, it is preferable that the elastic modulus of the pretreatment liquid film is the same as or less than the elastic modulus of the ink film formed by solidifying the second ink.

In a case where the elastic modulus of the pretreatment liquid film is less than the clastic modulus of the ink film formed by solidifying the second ink, the difference between the elastic modulus of the pretreatment liquid film and the elastic modulus of the ink film formed by solidifying the second ink is preferably in a range of 0.1 GPa to 2.0 GPa.

The pH of the pretreatment liquid is preferably 0.1 to 4.5, more preferably 0.2 to 4.0, from the viewpoint of the aggregation rate of the ink. The pH is measured at 25° C. using a pH meter, for example, a pH meter (model number "HM-31", manufactured by DKK-Toa Corporation).

From the viewpoint of the aggregation rate of the ink, the viscosity of the pretreatment liquid is preferably in a range of 0.5 mPa·s to 10 mPa·s and more preferably in a range of 1 mPa·s to 5 mPa·s. The viscosity is a value measured at 25° C. using a viscometer. The viscosity is measured at 25° C. using a viscometer, for example, a TV-22 type viscometer (manufactured by Toki Sangyo Co., Ltd.).

The surface tension of the pretreatment liquid is preferably 60 mN/m or less, more preferably in a range of 20 mN/m to 50 mN/m, and still more preferably in a range of 30 mN/m to 45 mN/m. The surface tension is a value measured at a temperature of 25° C. The surface tension is measured at 25° C. by a plate method using a surface tension meter, for example, an automatic surface tension meter (product name, "CBVP-Z", manufactured by Kyowa Interface Science Co., Ltd.).

<Image Recording Method>

First Aspect

It is preferable that an image recording method according to a first aspect of the present disclosure uses the above-described ink and includes a step of applying the ink onto a base material by an ink jet recording method.

(Base Material)

The base material is not particularly limited, and a known base material can be used.

Examples of the base material include a paper base material, a paper base material on which a resin (such as polyethylene, polypropylene, or polystyrene) is laminated, a resin base material, a metal plate (such as a plate made of a metal such as aluminum, zinc, or copper), a paper base material on which the above-described metal is laminated or vapor-deposited, and a resin base material on which the above-described metal is laminated or vapor-deposited.

Further, the base material may be a textile base material.

Examples of the material of the textile base material include natural fibers such as cotton, silk, hemp, and wool; chemical fibers such as viscose rayon and lyocell; synthetic fibers such as polyester, polyamide, and acryl; and a mixture of at least two selected from the group consisting of natural fibers, chemical fibers, and synthetic fibers. The textile base material may be the textile base material described in paragraphs to of WO2015/158592A.

It is preferable that the base material is an impermeable base material.

In the present disclosure, the impermeability in the impermeable base material denotes a property that the water absorption rate in 24 hours which is measured in conformity with ASTM D570-98 (2018) is 2.5% or less. Here, the unit "%" of the water absorption rate is on a mass basis. The water absorption rate is preferably 1.0% or less and more preferably 0.5% or less.

Examples of the material of the impermeable base material include glass, a metal (such as aluminum, zinc, or copper), and a resin (such as polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, nylon, or an acrylic resin).

It is preferable that the material of the impermeable base material is a resin.

Examples of the material of the impermeable base material are as described above, but polypropylene, polyethylene, polyethylene terephthalate, nylon, an acrylic resin, or polyvinyl chloride is preferable from the viewpoint of versatility.

As the shape of the impermeable base material, a sheet-like (film-like) or a plate-like impermeable base material is preferable. Examples of the impermeable base material having such a shape include a glass plate, a metal plate, a resin sheet (resin film), paper on which plastic is laminated, paper on which a metal is laminated or vapor-deposited, and a plastic sheet (plastic film) on which a metal is laminated or vapor-deposited.

Examples of the impermeable base material made of a resin include a resin sheet (resin film), and more specific examples thereof include a flexible packaging material for packaging food or the like and a panel for guiding the floor of a mass retailer.

Examples of the impermeable base material include a textile (woven fabric) or non-woven fabric formed of impermeable fibers in addition to a sheet-like (film-like) or plate-like impermeable base material.

Further, the thickness of the impermeable base material is preferably in a range of 0.1 μm to 1,000 μm, more preferably in a range of 0.1 μm to 800 μm, and still more preferably in a range of 1 μm to 500 μm.

The impermeable base material may be subjected to a hydrophilization treatment. Examples of the hydrophilization treatment include a corona treatment, a plasma treatment, a heat treatment, an abrasion treatment, a light irradiation treatment (such as a UV treatment), and a flame treatment, but the hydrophilization treatment is not limited thereto. The corona treatment can be performed using, for example, Corona Master (product name, "PS-10S", manufactured by Shinko Electric & Instrumentation Co., Ltd.). The conditions for the corona treatment may be appropriately selected according to the kind of the impermeable base material and the like.

(Ink Jet Recording Method)

The method of jetting the ink in the ink jet recording method is not particularly limited, and any of known methods such as an electric charge control method of jetting an ink using an electrostatic attraction force, a drop-on-demand method (pressure pulse method) using a vibration pressure of a piezoelectric element, an acoustic ink jet method of jetting an ink using a radiation pressure by converting an electric signal into an acoustic beam and irradiating the ink with the acoustic beam, and a thermal ink jet (bubble jet (registered trademark)) method of heating an ink to form air bubbles and using the generated pressure may be used.

As the ink jet recording method, particularly, an ink jet recording method, described in JP1979-59936A (JP-S54-59936A), of jetting an ink from a nozzle using an action force caused by a rapid change in volume of the ink after being subjected to an action of thermal energy can be effectively used. Further, as the ink jet recording method, the method described in paragraphs 0093 to 0105 of JP2003-306623A can also be employed.

The application of the ink onto the impermeable base material using the ink jet recording method can be performed by allowing the ink to be jetted from a nozzle of an ink jet head.

Examples of the system of the ink jet head include a shuttle system of performing recording while scanning a short serial head in the width direction of a recorded medium and a line system of using a line head in which recording elements are aligned in correspondence with the entire area of one side of a recorded medium.

In the line system, image recording can be performed on the entire surface of the recorded medium by scanning the recorded medium in a direction intersecting the direction in which the recording elements are aligned. In the line system, a transport system such as a carriage that scans a short head in the shuttle system is not necessary. Further, in the line system, since movement of a carriage and complicated scanning control between the short head and the recorded medium are not necessary as compared with the shuttle system, only the recorded medium moves. Therefore, according to the line system, image recording at a higher speed than that of the shuttle system can be realized.

It is preferable that the application of the ink is performed using an ink jet head having a resolution of 300 dpi or greater (more preferably 600 dpi or greater and still more preferably 800 dpi or greater). Here, dpi stands for dot per inch, and 1 inch is 2.54 cm.

From the viewpoint of obtaining an image with high definition, the ink droplet amount is preferably in a range of 1 picoliter (pL) to 10 pL and more preferably in a range of 1.5 pL to 6 pL.

Second Aspect

It is preferable that an image recording method according to a second aspect of the present disclosure uses an ink set including the first ink and the second ink and includes a step of applying the first ink and the second ink onto a base material by an ink jet recording method.

A multicolor image can be recorded by using an ink set including the first ink containing a white pigment (that is, a white ink) and the second ink containing a pigment other than the white pigment (that is, a colored ink).

The order of applying the first ink and the second ink on the base material is not particularly limited, but it is preferable that the first ink is applied after the second ink is applied. For example, a multicolor image in which a color pattern image (a character, a figure, or the like) recorded with the second ink (that is, a colored ink) and a white image in the form of a solid image recorded with the first image (that is, a white ink) to cover the pattern image are disposed on the base material in this order can be recorded. In this case, the pattern image can be visually recognized through the base material from a rear surface side (that is, a side of the base material where the image is not recorded) of the base material.

The details of the base material and the ink jet recording method in the second aspect are the same as the details of the base material and the ink jet recording method in the first aspect.

Third Aspect

It is preferable that an image recording method according to a third aspect of the present disclosure uses an ink set including the first ink, the second ink, and the pretreatment liquid and includes a step of applying the pretreatment liquid onto a base material and a step of applying the first ink and the second ink by an ink jet recording method onto the base material onto which the pretreatment liquid has been applied.

A multicolor image with high definition can be recorded by using an ink set that includes the first ink containing a white pigment (that is, a white ink), the second ink containing a pigment other than the white pigment (that is, a colored ink), and the pretreatment liquid.

The details of the base material and the ink jet recording method in the third aspect are the same as the details of the base material and the ink jet recording method in the first aspect.

A method of applying the pretreatment liquid is not particularly limited, and examples thereof include known methods such as a coating method, a dipping method, and an ink jet recording method.

Examples of the coating method include known coating methods using a bar coater, an extrusion die coater, an air doctor coater, a blade coater, a rod coater, a knife coater, a squeeze coater, and a reverse roll coater.

After the application of the pretreatment liquid, the pretreatment liquid applied onto the base material may be heated and dried. Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the base material opposite to the surface onto which the pretreatment liquid has been applied; a method of applying warm air or hot air to the surface of the base material onto which the pretreatment liquid has been applied; a method of applying heat using an infrared heater from the surface of the base material onto which the pretreatment liquid has been applied or from a side of the base material opposite to the surface onto which the pretreatment liquid has been applied; and a method of combining a plurality of these methods.

The heating temperature of heating and drying the pretreatment liquid is preferably 35° C. or higher and more preferably 40° C. or higher. The upper limit of the heating temperature is not particularly limited, but is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and still more preferably in a range of 0.5 seconds to 10 seconds.

[Method of Producing Laminate]

A method of producing a laminate of the present disclosure includes a step of obtaining an image recorded material that includes a base material and an image disposed on the base material by the image recording method of the present disclosure and a step of laminating a base material for lamination on a side of the image recorded material where the image has been disposed, to obtain a laminate.

According to the image recording method of the present disclosure, an image recorded material including a base material and an image recorded on the base material and having excellent lamination strength after a boiling treatment in a case where a base material for lamination is laminated on the image can be produced.

Therefore, the image recording method of the present disclosure is suitably used for producing a laminate including the above-described image recorded material and a base material for lamination which is laminated on a side of the image recorded material where the image is recorded.

According to the method of producing a laminate of the present disclosure, a laminate having excellent lamination strength between the image recorded material and the base material for lamination can be produced.

The step of obtaining an image recorded material can refer to the image recording method of the present disclosure.

The step of obtaining a laminate is a step of laminating the base material for lamination on a side of the image recorded material where the image has been disposed, to obtain a laminate. The lamination can be performed by a method of superimposing the base material for lamination on the side of the image recorded material where the image has been disposed via another layer (for example, an adhesive layer) and attaching the base material thereto, a method of attaching the base material for lamination to the side of the image recorded material where the image has been disposed via a laminator in a state where the base material is superimposed on the side thereof, or the like. In the latter case, a commercially available laminator can be used.

The lamination temperature in a case of carrying out the lamination is not particularly limited. For example, in a case where the image recorded material and the base material for lamination are attached to each other via another layer (for example, an adhesive layer), the temperature may be 20° C. or higher. Further, in a case where a laminator is used, the temperature of a laminating roll may be set to be in a range of 20° C. to 80° C. The pressure-bonding force between a pair of laminating rolls may be appropriately selected as necessary.

It is preferable that the base material for lamination is a resin base material. The resin base material is not particularly limited, and examples thereof include a base material consisting of a thermoplastic resin.

A base material obtained by molding a thermoplastic resin in a sheet shape is exemplified as the resin base material.

It is preferable that the resin base material contains polypropylene, polyethylene terephthalate, nylon, polyethylene, or polyimide.

The shape of the resin base material is not particularly limited, but it is preferable that the resin base material has a sheet shape. The thickness of the resin base material is preferably in a range of 10 μm to 200 μm and more preferably in a range of 10 μm to 100 μm.

In the step of obtaining a laminate, the base material for lamination may be laminated directly on a side of the image recorded material where the image has been disposed or via another layer (for example, an adhesive layer).

In a case where the base material for lamination is laminated directly on a side of the image recorded material where the image has been disposed, the lamination can be performed by a known method such as thermocompression bonding or thermal fusion welding.

Further, in a case where the base material for lamination is laminated on a side of the image recorded material where the image has been disposed via an adhesive layer, the lamination can be performed by, for example, a method of coating the side of the image recorded material where the image has been disposed with an adhesive, placing the base material for lamination, and bonding the image recorded material to the base material for lamination.

Further, in the case where the base material for lamination is laminated on a side of the image recorded material where the image has been disposed via an adhesive layer, the lamination can also be performed by an extrusion lamination method (that is, sandwich lamination) or the like.

It is preferable that the adhesive layer contains an isocyanate compound. In a case where the adhesive layer contains an isocyanate compound, since the adhesiveness between the adhesive layer and the image is further improved, the lamination strength can be further improved.

EXAMPLES

Hereinafter, the present disclosure will be described in more detail based on examples, but the present disclosure is not limited to the following examples unless the gist thereof is overstepped.

In preparation of an ink, first, a dispersing resin was synthesized.

—Synthesis of Dispersing Resin 1—

100 g of dipropylene glycol was added to a three-neck flask provided with a stirrer and a cooling pipe and heated to 85° C. in a nitrogen atmosphere.

A solution 1 obtained by mixing 14.0 g of stearyl methacrylate, 35.3 g of benzyl methacrylate, 20.0 g of hydroxyethyl methacrylate, 30.7 g of methacrylic acid, and 0.55 g of 2-mercaptopropionic acid and a solution 2 obtained by dissolving 1.0 g of t-butylperoxy-2-ethylhexanoate (product name, "Perbutyl O", manufactured by NOF Corporation) in 20 g of dipropylene glycol were respectively prepared. The solution 1 was added dropwise to the three-neck flask for 4 hours, and the solution 2 was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance (1H-NMR) method.

The obtained reaction solution was heated to 70° C., 12.0 g of dimethylethanolamine was added thereto as an amine compound, propylene glycol was added thereto, and the solution was stirred, thereby obtaining a 30 mass % solution of a dispersing resin 1 which was a polymer.

The structural unit of the obtained dispersing resin 1 was confirmed by $^1$H-NMR. Further, the weight-average molecular weight (Mw) determined by GPC was 28000.

Further, the mass ratio of respective structural units in the dispersing resin 1 (structural unit derived from stearyl methacrylate/structural unit derived from benzyl methacrylate/structural unit derived from hydroxyethyl methacrylate/structural unit derived from methacrylic acid) was 14/35.3/20/30.7. Here, the mass ratio does not include the mass of dimethylaminoethanol.

The acid value of the dispersing resin 1 was 200 mgKOH/g.

—Synthesis of Dispersing Resin 2—

100 g of dipropylene glycol was added to a three-neck flask provided with a stirrer and a cooling pipe and heated to 85° C. in a nitrogen atmosphere.

A solution 1 obtained by mixing 14.0 g of stearyl methacrylate, 43.0 g of benzyl methacrylate, 20.0 g of hydroxyethyl methacrylate, 23.0 g of methacrylic acid, and 0.55 g of 2-mercaptopropionic acid and a solution 2 obtained by dissolving 1.0 g of t-butylperoxy-2-ethylhexanoate (product name, "Perbutyl O", manufactured by NOF Corporation) in 20 g of dipropylene glycol were respectively prepared. The solution 1 was added dropwise to the three-neck flask for 4 hours, and the solution 2 was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance (1H-NMR) method.

The obtained reaction solution was heated to 70° C., 12.0 g of dimethylethanolamine was added thereto as an amine compound, propylene glycol was added thereto, and the solution was stirred, thereby obtaining a 30 mass % solution of a dispersing resin 2 which was a polymer.

The structural unit of the obtained dispersing resin 2 was confirmed by 1H-NMR. Further, the weight-average molecular weight (Mw) determined by GPC was 26000.

Further, the mass ratio of respective structural units in the dispersing resin 2 (structural unit derived from stearyl methacrylate/structural unit derived from benzyl methacrylate/structural unit derived from hydroxyethyl methacrylate/structural unit derived from methacrylic acid) was 14/43/20/23. Here, the mass ratio does not include the mass of dimethylaminoethanol.

The acid value of the dispersing resin 2 was 150 mgKOH/g.

—Synthesis of Dispersing Resin 3—

100 g of dipropylene glycol was added to a three-neck flask provided with a stirrer and a cooling pipe and heated to 85° C. in a nitrogen atmosphere.

A solution 1 obtained by mixing 14.0 g of stearyl methacrylate, 27.6 g of benzyl methacrylate, 20.0 g of hydroxyethyl methacrylate, 38.4 g of methacrylic acid, and 0.55 g of 2-mercaptopropionic acid and a solution 2 obtained by dissolving 1.0 g of t-butylperoxy-2-ethylhexanoate (product name, "Perbutyl O", manufactured by NOF Corporation) in 20 g of dipropylene glycol were respectively prepared. The solution 1 was added dropwise to the three-neck flask for 4 hours, and the solution 2 was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance (1H-NMR) method.

The obtained reaction solution was heated to 70° C., 12.0 g of dimethylethanolamine was added thereto as an amine compound, propylene glycol was added thereto, and the solution was stirred, thereby obtaining a 30 mass % solution of a dispersing resin 3 which was a polymer.

The structural unit of the obtained dispersing resin 3 was confirmed by 1H-NMR. Further, the weight-average molecular weight (Mw) determined by GPC was 22000.

Further, the mass ratio of respective structural units in the dispersing resin 3 (structural unit derived from stearyl methacrylate/structural unit derived from benzyl methacrylate/structural unit derived from hydroxyethyl methacrylate/structural unit derived from methacrylic acid) was 14/27.6/20/38.4. Here, the mass ratio does not include the mass of dimethylaminoethanol.

The acid value of the dispersing resin 3 was 250 mgKOH/g.

—Synthesis of Dispersing Resin 4—

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 71.6 g of benzyl methacrylate, 18.4 g of methacrylic acid, and 10.0 g of methyl methacrylate in 50 g of methyl ethyl ketone was added dropwise thereto for 3 hours. After completion of the dropwise addition, the solution was allowed to further react for 1 hour, a solution obtained by dissolving 0.42 g of dimethyl 2,2'-azobisisobutyrate in 2 g of methyl ethyl ketone was added thereto, and the solution was heated to 78° C. and further heated for 4 hours. The obtained reaction solution was reprecipitated twice in a largely excessive amount of hexane, and the deposited resin was dried, thereby obtaining a dispersing resin 4.

The structural unit of the obtained dispersing resin 4 was confirmed by 1H-NMR. Further, the weight-average molecular weight (Mw) determined by GPC in terms of polystyrene was 44600.

Further, the mass ratio of respective structural units in the dispersing resin 4 (structural unit derived from benzyl methacrylate/structural unit derived from methyl methacrylate/structural unit derived from methacrylic acid) was 71.6/10/18.4.

The acid value of the dispersing resin 4 was 120 mgKOH/g.

—Synthesis of Dispersing Resin 5—

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 62.4 g of benzyl methacrylate, 27.6 g of methacrylic acid, and 10.0 g of methyl methacrylate in 50 g of methyl ethyl ketone was added dropwise thereto for 3 hours, thereby obtaining a dispersing resin 5 using the same method as the method for the dispersing resin 4.

The structural unit of the obtained dispersing resin 5 was confirmed by 1H-NMR. Further, the weight-average molecular weight (Mw) determined by GPC in terms of polystyrene was 44800.

Further, the mass ratio of respective structural units in the dispersing resin 5 (structural unit derived from benzyl methacrylate/structural unit derived from methyl methacrylate/structural unit derived from methacrylic acid) was 62.4/10/27.6.

The acid value of the dispersing resin 5 was 180 mgKOH/g.

—Synthesis of Dispersing Resin 6—

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 53.2 g of benzyl methacrylate, 36.8 g of methacrylic acid, and 10.0 g of methyl methacrylate in 50 g of methyl ethyl ketone was added dropwise thereto for 3 hours, thereby obtaining a dispersing resin 6 using the same method as the method for the dispersing resin 4.

The structural unit of the obtained dispersing resin 6 was confirmed by $^{1}$H-NMR. Further, the weight-average molecular weight (Mw) determined by GPC in terms of polystyrene was 42000.

Further, the mass ratio of respective structural units in the dispersing resin 6 (structural unit derived from benzyl methacrylate/structural unit derived from methyl methacrylate/structural unit derived from methacrylic acid) was 53.2/10/36.8.

The acid value of the dispersing resin 6 was 240 mgKOH/g.

Example 1

—Preparation of Pigment Dispersion Liquid 1—

A pigment dispersion liquid 1 was prepared using a Lady Mill model LSG-4U-08 (manufactured by AIMEX Co., Ltd.).

45 parts by mass of titanium dioxide particles (trade name, "PF-690", average primary particle diameter: 210 nm, manufactured by Ishihara Sangyo Kaisha, Ltd.) serving as a white pigment, 15 parts by mass of a 30 mass % solution of the dispersing resin 1, and 40 parts by mass of ultrapure water were added to a zirconia container. Further, 40 parts by mass of 0.5 mmφ zirconia beads (Torayceram beads, manufactured by Toray Industries, Inc.) were added thereto, and the mixture was mixed gently using a spatula. The zirconia container having the obtained mixture was put into a Lady mill and dispersed at a rotation speed of 1000 rpm (revolutions per minute) for 5 hours. After completion of the dispersion, the beads were removed by filtration with a filter cloth, thereby obtaining a pigment dispersion liquid 1 having a white pigment concentration of 45% by mass.

—Preparation of Ink—

An ink with the following composition was prepared using the pigment dispersion liquid 1, 1,2-propanediol, propylene glycol monomethyl ether, a surfactant (product name, "OLFINE (registered trademark) E1010", manufactured by Nissin Chemical Co., Ltd.), and water.

| | |
|---|---|
| White pigment | 15% by mass |
| Dispersing resin: dispersing resin 1 | 1.5% by mass |
| 1,2-Propanediol | 15% by mass |
| Propylene glycol monomethyl ether | 5% by mass |
| Surfactant | 1% by mass |
| Water remaining amount set such that total amount of composition was | 100% by mass |

Examples 2 to 18 and Comparative Examples 1 to 6

In Examples 2 to 18 and Comparative Examples 1 to 6, each pigment dispersion liquid was prepared by the same method as in Example 1 such that the kind and the content of the dispersing resin were set as the kind and the content listed in Table 1, and each ink was prepared using the additive resin listed in Table 1. The contents of the white pigment, 1,2-propanediol, propylene glycol monomethyl ether, and the surfactant are the same as in Example 1. Further, the resin 1, the resin 2, and the resin 3 in Table 1 denote the dispersing resin 1, the dispersing resin 2, and the dispersing resin 3 described above.

The details of the additive resins listed in Table 1 are as follows. The emulsion denotes a dispersion liquid containing a resin, and the resin is present in a liquid in the form of resin particles. The water-soluble resin denotes an aqueous solution containing a resin. In Table 1, the styrene acrylic resin in the columns of the type of resin is simply described as "acrylic resin".

NEOCRYLA-1105: acrylic resin emulsion, manufactured by DSM Co., Ltd.

NEOCRYL XK-12: acrylic resin emulsion, manufactured by DSM Co., Ltd.

NEOCRYLA-1127: acrylic resin emulsion, manufactured by DSM Co., Ltd.

NEOCRYL A-6092: acrylic resin emulsion, manufactured by DSM Co., Ltd.

NEOCRYL A-1091: styrene acrylic resin emulsion, manufactured by DSM Co., Ltd.

VINYBLAN 715: vinyl chloride-based emulsion, manufactured by Nissin Chemical Co., Ltd.

PERMARIN UA-200: urethane resin emulsion, manufactured by Sanyo Chemical Industries, Ltd.

JONCRYL JDX-6500: water-soluble acrylic resin, manufactured by BASF SE

<Image Recording>

Image recording was performed using the prepared ink.

An ink jet recording device including a transport system for continuously transporting a long base material and an ink jet head for applying the ink was prepared.

Further, a polyethylene terephthalate (PET) base material ("FE2001", manufactured by Futamura Chemical Co., Ltd., (thickness of 12 μm, width of 780 mm, length of 4000 m), hereinafter, referred to as "impermeable base material A") serving as an impermeable base material was prepared as the base material.

A solid image was recorded by applying the ink in the form of a solid image under the following application conditions while the impermeable base material A was continuously transported at 50 m/min using the ink jet recording device and drying the applied ink with warm air at 80° C. for 30 seconds, thereby obtaining an image recorded material.

—Ink Application Conditions—

Ink jet head: 1200 dpi/30 inch-width piezo full line head

Amount of ink jetted from ink jet head: 3.0 picoliters (pL)

Driving frequency: 41 kHz (transportation speed of base material: 50 m/min)

[Measurement]

The acid value of the ink and the elastic modulus of the ink film formed by solidifying the ink were measured for each example and each comparative example. The measuring method is as follows. The measurement results are listed in Table 1.

(Acid Value)

The acid value of the ink was measured in conformity with the method described in JIS K 0070: 1992.

(Elastic Modulus)

The elastic modulus of the surface of the image recorded material on a side where the image was recorded was measured by a nanoindentation method. A nanotriboindenter TI-950 (manufactured by Hysitron, Inc.) was used as a measuring device. The elastic modulus was measured at an indentation depth of 500 nm using a cube corner indenter as an indenter for nanoindentation.

[Evaluation]

The lamination strength, the adhesiveness, the storage stability, and the character quality of the image recorded material were evaluated for each example and each comparative example. The evaluation method is as follows. The evaluation results are listed in Table 1.

(Lamination Strength)

A region having a length of 500 mm and a width of 200 mm in which the solid image was provided on the entire surface was cut out from the image recorded material and used as a lamination strength evaluation sample.

The solid image in the lamination strength evaluation sample was coated with an adhesive for dry lamination (main agent TM-320 (isocyanate compound)/curing agent CAT-13B (alcohol compound), manufactured by Toyo-Morton, Ltd.) using a bar coater, and a linear low-density polyethylene film (trade name, "LL-XMTN", manufactured by Futamura Chemical Co., Ltd., thickness of 40 μm) was superimposed thereon as a base material for lamination. In this state, the base material for lamination and the lamination strength evaluation sample were attached to each other, thereby obtaining a laminate.

The obtained laminate was aged at 40° C. for 48 hours.

A sample piece having a length of 100 mm and a width of 15 mm was cut out from the aged laminate.

Next, the base material for lamination and the lamination strength evaluation sample in a region from the one end in the longitudinal direction to a length of 30 mm in the sample piece were peeled by hand. The remaining region with a length of 70 mm was allowed to remain in a state where the base material for lamination and the lamination strength evaluation sample were attached to each other.

Next, a tensile test of stretching the peeled portion of the base material for lamination and the peeled portion of the lamination strength evaluation sample in opposite directions in the sample piece was performed. The stretching direction was a direction perpendicular to the above-described remaining region with a length of 70 mm (the remaining region in a state where the base material for lamination and the lamination strength evaluation sample were attached to each other).

The peel strength in the remaining region with a length of 70 mm in a case where the base material for lamination and the lamination strength evaluation sample were peeled off was acquired by this tensile test. The obtained peel strength was defined as the lamination strength. The evaluation standards are as follows.

Further, the tensile test was performed using a tensile tester (product name, "TENSILON RTM-25", manufactured by Orientec Co., Ltd.).

6: The lamination strength between the image recorded material and the base material for lamination was 2.5 N/15 mm or greater.

5: The lamination strength between the image recorded material and the base material for lamination was 2 N/15 mm or greater and less than 2.5 N/15 mm.

4: The lamination strength between the image recorded material and the base material for lamination was 1.5 N/15 mm or greater and less than 2 N/15 mm.

3: The lamination strength between the image recorded material and the base material for lamination was 1 N/15 mm or greater and less than 1.5 N/15 mm.

2: The lamination strength between the image recorded material and the base material for lamination was 0.5 N/15 mm or greater and less than 1 N/15 mm.

1: The lamination strength between the image recorded material and the base material for lamination was less than 0.5 N/15 mm.

(Adhesiveness)

The adhesiveness was evaluated by attaching a piece of Cellotape (registered trademark, No. 405, manufactured by Nichiban Co., Ltd., width of 12 mm, hereinafter, also simply referred to as "tape") onto the solid image in the image recorded material and peeling the piece of tape off from the image.

Specifically, the tape was attached and peeled off according to the following method.

The tape was taken out at a constant speed and cut to have a length of approximately 75 mm, thereby obtaining a piece of tape.

The obtained piece of tape was superimposed on the solid image, and a region in the piece of tape at a center with a width of 12 mm and a length of 25 mm was attached onto the image using a finger and rubbed firmly with a fingertip.

An end of the piece of tape was grasped in 5 minutes after the piece of tape was attached onto the image and was peeled off from the image at an angle as close as possible to 60° for 0.5 to 1.0 seconds.

The presence or absence of adhesive matter on the peeled piece of tape and the presence or absence of peeling of the solid image were visually observed. The evaluation standards are as follows.

5: Adhesive matter was not found on the piece of tape, and the image was also not peeled off.

4: A slight amount of adhesive matter was found on the piece of tape, but the image was not peeled off.

3: A slight amount of adhesive matter was found on the piece of tape and the image was slightly peeled off in an acceptable range for practical use.

2: Adhesive matter was found on the piece of tape and the image was peeled off, which were out of an acceptable range for practical use.

1: Adhesive matter was found on the piece of tape, most of the image was peeled off, and the base material was visually recognized.

(Storage Stability)

The storage stability of the ink was evaluated in the following manner.

The viscosity of the ink that was allowed to stand at 25° C. for 1 hour after the preparation of the ink (hereinafter, referred to as "viscosity before storage") and the viscosity of the ink that was stored in a sealed state at 50° C. for 14 days after the preparation of the ink (hereinafter, referred to as "viscosity after storage") were respectively measured. Both the viscosity before storage and the viscosity after storage were measured under conditions of 30° C. at 100 rpm (revolutions per minute) using VISCOMETER TV-22 (manufactured by TOKI SANGYO CO., LTD). Here, the sealed state indicates a state in which the contents are sealed in a container and the amount of decrease in the mass of the contents is less than 1% by mass in a case where the contents are stored under the conditions of 50° C. for 14 days.

A value obtained by subtracting the viscosity before storage from the viscosity after storage was calculated as a degree of an increase in viscosity. As the degree of an increase in viscosity decreases, the storage stability is excellent. The evaluation standards are as follows.

5: The degree of an increase in viscosity was less than 0.3 mPa·s.

4: The degree of an increase in viscosity was 0.3 mPa·s or greater and less than 0.5 mPa·s.

3: The degree of an increase in viscosity was 0.5 mPa·s or greater and less than 1.0 mPa·s.

2: The degree of an increase in viscosity was 1.0 mPa·s or greater and less than 2.0 mPa·s.

1: The degree of an increase in viscosity was 2.0 mPa·s or greater.

(Character Quality)

An image recorded material in which a character image was recorded on the impermeable base material A was obtained by the same method as that for the image recording described above. The character (Unicode: U+9DF9) illustrated in FIG. 1 was output in sizes of 4 pt, 6 pt, 8 pt, and 10 pt as the character image. Here, pt indicates the DTP point representing the font size, and 1 pt is 1/72 inch.

The character quality was evaluated by observing each character image on the image recorded material and determining whether or not the image was reproducible. The expression "able to be reproduced" means that the horizontal line indicated by 11 shown in FIG. 1 and the horizontal line indicated by 12 shown in FIG. 1 in the character images shown in FIG. 1 were separated in a case where the characters were confirmed from a place separated by 0.5 m. The evaluation standards are as follows.

The evaluation results are listed in Tables 1 and 2.

5: Characters having a size of 4 pt were reproducible.

4: Characters having a size of 6 pt were reproducible, but characters having a size of 4 pt were not reproducible.

3: Characters having a size of 6 pt or less were reproducible, but characters having a size of 8 pt were not reproducible.

2: Characters having a size of 10 pt were reproducible, but characters having a size of 8 pt or less were not reproducible.

1: Characters having a size of 10 pt were not reproducible.

In Table 1, the acid value is in units of "mgKOH/g" and the elastic modulus is in units of "GPa", but the units are omitted. In addition, "-" denotes that the measurement or the evaluation was not made.

TABLE 1

| | Dispersing resin | | | Additive resin | | | | | Elastic modulus | Evaluation | | | |
|---|---|---|---|---|---|---|---|---|---|---|---|---|---|
| | Type | Acid value | Content (% by mass) | Type | Product name | Acid value | Content (% by mass) | Acid value of ink | | Lamination strength | Adhesiveness | Storage stability | Character quality |
| Example 1 | Resin 1 | 200 | 1.5 | | — | | | 3 | 2 | 3 | 3 | 5 | 3 |
| Example 2 | Resin 1 | 200 | 1.5 | Acryl | NEOCRYL A-1105 | 10 | 4 | 3.4 | 3.5 | 6 | 5 | 5 | 3 |
| Example 3 | Resin 1 | 200 | 1.5 | Acryl | NEOCRYL XK-12 | 11 | 4 | 3.4 | 2.6 | 6 | 5 | 5 | 3 |
| Example 4 | Resin 1 | 200 | 1.5 | Acryl | NEOCRYL A-1127 | 18 | 4 | 3.7 | 2.4 | 5 | 5 | 5 | 3 |
| Example 5 | Resin 1 | 200 | 1.5 | Acryl | NEOCRYL A-6092 | 33 | 4 | 4.3 | 3.4 | 5 | 5 | 5 | 3 |
| Example 6 | Resin 1 | 200 | 1.5 | Acryl | NEOCRYL A-1091 | 62 | 4 | 5.5 | 4.2 | 4 | 5 | 5 | 3 |
| Example 7 | Resin 1 | 200 | 1.5 | Vinyl chloride | VINYBLAN 715 | 8 | 4 | 3.3 | 4.4 | 6 | 5 | 5 | 3 |
| Example 8 | Resin 1 | 200 | 1.5 | Urethane | PERMARIN UA-200 | 21 | 4 | 3.8 | 2.1 | 5 | 5 | 5 | 3 |
| Example 9 | Resin 1 | 200 | 0.75 | Acryl (water-soluble) | JONCRYL JDX-6500 | 85 | 4 | 4.9 | 3 | 4 | 5 | 5 | 3 |
| Example 10 | Resin 1 | 200 | 0.75 | Acryl | NEOCRYL A-1105 | 10 | 4 | 1.9 | 3.3 | 6 | 5 | 5 | 3 |
| Example 11 | Resin 1 | 200 | 3 | Acryl | NEOCRYL A-1105 | 10 | 4 | 6.4 | 3.6 | 5 | 5 | 5 | 3 |
| Example 12 | Resin 1 | 200 | 3.75 | Acryl | NEOCRYL A-1105 | 10 | 4 | 7.9 | 3.6 | 5 | 5 | 5 | 3 |
| Example 13 | Resin 1 | 200 | 1.5 | Acryl | NEOCRYL A-1105 | 10 | 2 | 3.2 | 2.4 | 5 | 3 | 5 | 3 |
| Example 14 | Resin 1 | 200 | 1.5 | Acryl | NEOCRYL A-1105 | 10 | 8 | 3.8 | 3.4 | 6 | 5 | 5 | 3 |
| Example 15 | Resin 1 | 200 | 1.5 | Acryl | NEOCRYL A-1105 | 10 | 10 | 4 | 3.5 | 6 | 5 | 3 | 3 |
| Example 16 | Resin 2 | 150 | 1.5 | Acryl | NEOCRYL A-1105 | 10 | 4 | 2.7 | 3 | 6 | 5 | 5 | 3 |
| Example 17 | Resin 3 | 250 | 1.5 | Acryl | NEOCRYL A-1105 | 10 | 4 | 4.2 | 3.7 | 5 | 5 | 5 | 3 |
| Example 18 | Resin 2 | 150 | 0.75 | Acryl | NEOCRYL A-1105 | 10 | 2 | 1.3 | 2.3 | 5 | 3 | 3 | 3 |
| Comparative Example 1 | Resin 1 | 200 | 3.75 | Acryl | NEOCRYL A-1105 | 10 | 8 | 8.3 | — | 1 | — | — | 3 |
| Comparative Example 2 | Resin 3 | 250 | 3.75 | Acryl | NEOCRYL A-1105 | 10 | 4 | 9.8 | — | 1 | — | — | 3 |
| Comparative Example 3 | Resin 1 | 200 | 3 | Acryl | NEOCRYL A-1091 | 62 | 4 | 8.5 | — | 1 | — | — | 3 |
| Comparative Example 4 | Resin 3 | 250 | 3 | Acryl | NEOCRYL A-1127 | 18 | 4 | 8.2 | — | 1 | — | — | 3 |
| Comparative Example 5 | Resin 2 | 150 | 3 | Acryl | NEOCRYL A-1091 | 62 | 8 | 9.5 | — | 1 | — | — | 3 |
| Comparative Example 6 | Resin 3 | 250 | 1.5 | Acryl | NEOCRYL A-1091 | 62 | 8 | 8.7 | — | 1 | — | — | 3 |

As listed in Table 1, it was found that since the inks of Examples 1 to 18 contained water, a white pigment, and at least two kinds of resins and had an acid value of 8.0 mgKOH/g or less, the lamination strength of the image recorded material was excellent.

On the contrary, it was found that the inks of Comparative Examples 1 to 6 had an acid value of greater than 8.0 mgKOH/g, and the lamination strength of the image recorded material was deteriorated.

In Example 16, the acid value of the ink was 1.5 mgKOH/g or greater, and the lamination strength was higher and the stability was more excellent as compared with Example 18. Further, in Example 16, the acid value of the ink was 4.0 mgKOH/g or less, and the lamination strength was higher as compared with Example 17.

In Example 3, the elastic modulus of the ink film was 2.5 GPa or greater, and the lamination strength was higher as compared with Examples 4, 8, and 13.

In Example 2, the ink contained resin particles, and the lamination strength was higher and the adhesiveness was more excellent as compared with Example 1.

In Example 2, the acid value of the resin particles was 40 mgKOH/g or less, and the lamination strength was higher as compared with Examples 6 and 9.

In Example 14, the content of the resin particles was 3% by mass or greater with respect to the total amount of the ink, and the adhesiveness was more excellent as compared with Example 13. In Example 14, the content of the resin particles was 8% by mass or less with respect to the total amount of the ink, and the stability was more excellent as compared with Example 15.

Example 101

<Preparation of First Ink>

A pigment dispersion liquid 1 was obtained in the same manner as in Example 1. The first ink was prepared by the same method as in Example 1 using the additive resin listed in Table 2. The contents of the white pigment, 1,2-propanediol, propylene glycol monomethyl ether, and the surfactant are the same as in Example 1.

<Preparation of Second Ink>

—Preparation of Pigment Dispersion Liquid 4—

C.I. Pigment Blue 15:3 (manufactured by Dainichiseika Color & Chemicals Mfg. Co., Ltd.) (4 parts by mass) which is a cyan pigment, the dispersing resin 4 (2 parts by mass), methyl ethyl ketone (42 parts by mass), a 1 mol/L NaOH aqueous solution (5.5 parts by mass), and water (87.2 parts by mass) were mixed. The mixture was dispersed by a beads mill using 0.1 mmφ zirconia beads at a rotation speed of 2500 for 6 hours. The obtained dispersion liquid was concentrated under reduced pressure at 55° C. until methyl ethyl ketone was sufficiently distilled off, and a part of water was further removed. Thereafter, a centrifugation treatment (using a 50 mL centrifugal tube) was performed at a rotation speed of 8000 rpm for 30 minutes using a high-speed centrifugal cooler 7550 (manufactured by Kubota Corporation) to remove the precipitate, and the supernatant solution was recovered.

As described above, a pigment dispersion liquid 4 containing a cyan pigment partially coated with the dispersing resin 4 was obtained.

—Preparation of Second Ink—

An ink with the following composition was prepared using the pigment dispersion liquid 4, 1,2-propanediol, propylene glycol monomethyl ether, a surfactant (product name, "OLFINE (registered trademark) E1010", manufactured by Nissin Chemical Co., Ltd.), the additive resin listed in Table 2, and water.

| | |
|---|---|
| Cyan pigment | 5% by mass |
| Dispersing resin: dispersing resin 4 | 2.5% by mass |
| 1,2-Propanediol | 20% by mass |
| Propylene glycol monomethyl ether: | 5% by mass |
| Surfactant | 1% by mass |
| Additive resin | 6 parts by mass |
| Water remaining amount set such that total amount of composition was | 100% by mass |

<Image Recording>

Image recording was performed using the first ink and the second ink prepared above.

An ink jet recording device including a transport system for continuously transporting a long base material, a first ink jet head for applying the first ink, and a second ink jet head for applying the second ink was prepared.

Further, a polyethylene terephthalate (PET) base material ("FE2001", manufactured by Futamura Chemical Co., Ltd., (thickness of 12 μm, width of 780 mm, length of 4000 m), hereinafter, referred to as "impermeable base material A") serving as an impermeable base material was prepared as the base material.

The second ink was jetted from the second ink jet head and applied in the form of a solid image while the impermeable base material A was continuously transported at 50 m/min using the ink jet recording device, and the first ink was jetted from the first ink jet head and applied onto the applied second ink in the form of a solid image. A solid image was recorded by drying the applied ink with warm air at 80° C. for 30 seconds, thereby obtaining an image recorded material.

—Ink Application Conditions—

Ink jet head: 1200 dpi/30 inch-width piezo full line head

Amount of ink jetted from ink jet head: 3.0 picoliters (pL)

Driving frequency: 41 kHz (transportation speed of base material: 50 m/min)

Examples 102 to 120

In Examples 102 to 120, each pigment dispersion liquid was prepared by the same method as in Example 101 such that the kind and the content of the dispersing resin were set as the kind and the content listed in Table 2. Further, the first ink and the second ink were prepared by the same method as in Example 101, using the additive resin listed in Table 2. The contents of the white pigment, 1,2-propanediol, propylene glycol monomethyl ether, and the surfactant in the first ink are the same as in Example 101. The contents of the cyan pigment, 1,2-propanediol, propylene glycol monomethyl ether, and the surfactant in the second ink are the same as in Example 101.

Examples 121 and 122

—Preparation of First Ink and Second Ink—

The first ink and the second ink in Example 121 are the same as the first ink and the second ink in Example 101.

The first ink and the second ink in Example 122 are the same as the first ink and the second ink in Example 102.

—Preparation of Pretreatment Liquid—

The following components were mixed to have the following contents, thereby preparing a pretreatment liquid.

Aggregating agent: glutaric acid: 4.1% by mass

Polyester resin: PESRESIN A-520 (manufactured by Takamatsu Oil & Fat Co., Ltd.): 6% by mass (content of resin particles serving as solid content)

Propylene glycol: 10% by mass

Water: 79.9% by mass

<Image Recording>

Image recording was performed using the pretreatment liquid, the first ink, and the second ink prepared above.

An ink jet recording device including a transport system for continuously transporting a long base material, a wire bar coater for coating the base material with the pretreatment liquid, a first ink jet head for applying the first ink, and a second ink jet head for applying the second ink was prepared.

Further, a polyethylene terephthalate (PET) base material ("FE2001", manufactured by Futamura Chemical Co., Ltd., (thickness of 12 μm, width of 780 mm, length of 4000 m), hereinafter, referred to as "impermeable base material A") serving as an impermeable base material was prepared as the base material.

The impermeable base material A was coated with the pretreatment liquid using a wire bar coater such that the amount of the pretreatment liquid to be applied reached approximately 1.7 g/m$^2$, and the pretreatment liquid was dried at 50° C. for 2 seconds.

The second ink was jetted from the second ink jet head and applied, in the form of a solid image, to the surface of the impermeable base material A which had been coated with the pretreatment liquid while the impermeable base material A was continuously transported at 50 m/min using the ink jet recording device, and the first ink was jetted from the first ink jet head and applied onto the applied second ink in the form of a solid image. A solid image was recorded by drying the applied ink with warm air at 80° C. for 30 seconds, thereby obtaining an image recorded material.

—Ink Application Conditions—

Ink jet head: 1200 dpi/30 inch-width piezo full line head

Amount of ink jetted from ink jet head: 3.0 picoliters (pL)

Driving frequency: 41 kHz (transportation speed of base material: 50 m/min)

[Evaluation]

The lamination strength and the character quality of the image recorded material were evaluated by measuring the acid values and the elastic moduli of the first ink, the second ink, and the pretreatment liquid for each example. The method of measuring the acid values of the first ink, the second ink, and the pretreatment liquid and the method of evaluating the lamination strength and the character quality are the same as in Example 1. A method of measuring the elastic moduli is as follows. The measurement results and the evaluation results are listed in Table 2.

(Elastic Modulus of Ink Film Formed by Solidifying First Ink)

The elastic modulus of the surface of the image recorded material obtained by performing the image recording described above on a side where the image was recorded was measured by a nanoindentation method. A nanotriboindenter TI-950 (manufactured by Hysitron, Inc.) was used as a measuring device. The elastic modulus was measured at an indentation depth of 500 nm using a cube corner indenter as an indenter for nanoindentation.

(Elastic Modulus of Ink Film Formed by Solidifying Second Ink)

The second ink was jetted from an ink jet head and applied onto the impermeable base material A in the form of a solid image while the impermeable base material A was continuously transported at 50 m/min using the ink jet recording device. A solid image was recorded by drying the applied ink with warm air at 80° C. for 30 seconds, thereby obtaining an image recorded material. The elastic modulus was measured by the same method as described above using this image recorded material.

(Elastic Modulus of Pretreatment Liquid Film Formed by Solidifying Pretreatment Liquid)

The impermeable base material A was coated with the pretreatment liquid using a wire bar coater such that the coating amount reached approximately 1.7 g/m$^2$, and the pretreatment liquid was dried at 80° C. for 30 seconds. The elastic modulus of the formed pretreatment liquid film was measured by the same method as described above.

In Table 2, A1 defines the acid value of the first ink, and A2 defines the acid value of the second ink. The value obtained by subtracting the acid value of the second ink from the acid value of the first ink is described as "A1−A2". Further, B1 denotes the elastic modulus of the ink film formed by solidifying the first ink, B2 denotes the elastic modulus of the ink film formed by solidifying the second ink, and B3 denotes the elastic modulus of the pretreatment liquid film formed by solidifying the pretreatment liquid. Further, "B1−B2" denotes the value obtained by subtracting the elastic modulus of the second ink film from the elastic modulus of the first ink film, and "B2−B3" denotes the value obtained by subtracting the elastic modulus of the pretreatment liquid film from the elastic modulus of the second ink film.

TABLE 2

| | Pretreatment liquid | Second ink | | | | | | | | |
|---|---|---|---|---|---|---|---|---|---|---|
| | | Dispersing resin | | | Additive resin | | | | | |
| | Elastic modulus B3 | Type | Acid value | Content (% by mass) | Type | Product name | Acid value | Content (% by mass) | Acid value A2 of ink | Elastic modulus B2 |
| Example 101 | — | Resin 4 | 120 | 2.5 | Acryl | NEOCRYL A-1105 | 10 | 6 | 3.6 | 3.3 |
| Example 102 | — | Resin 4 | 120 | 2.5 | Acryl | NEOCRYL XK-12 | 11 | 6 | 3.7 | 2.6 |
| Example 103 | — | Resin 4 | 120 | 2.5 | Acryl | NEOCRYL A-1127 | 18 | 6 | 4.1 | 2.2 |
| Example 104 | — | Resin 4 | 120 | 2.5 | Acryl | NEOCRYL A-6092 | 33 | 6 | 5 | 3 |
| Example 105 | — | Resin 4 | 120 | 2.5 | Acryl | NEOCRYL A-1091 | 62 | 6 | 6.7 | 3.7 |
| Example 106 | — | Resin 4 | 120 | 2.5 | Vinyl chloride | VINYBLAN 715 | 8 | 6 | 3.5 | 4.2 |
| Example 107 | — | Resin 4 | 120 | 2.5 | Urethane | PERMARIN UA-200 | 21 | 6 | 4.3 | 2 |
| Example 108 | — | Resin 4 | 120 | 2.5 | Acryl | NEOCRYL A-1127 | 18 | 6 | 4.1 | 2.2 |
| Example 109 | — | Resin 4 | 120 | 2.5 | Acryl | NEOCRYL A-6092 | 33 | 6 | 5 | 3 |
| Example 110 | — | Resin 4 | 120 | 2.5 | Acryl | NEOCRYL A-1091 | 62 | 6 | 6.7 | 3.7 |
| Example 111 | — | Resin 5 | 180 | 2.5 | Acryl | NEOCRYL A-1105 | 10 | 6 | 5.1 | 3.2 |
| Example 112 | — | Resin 5 | 180 | 2.5 | Acryl | NEOCRYL A-6092 | 33 | 6 | 6.5 | 2.8 |
| Example 113 | — | Resin 6 | 240 | 2.5 | Acryl | NEOCRYL A-1105 | 10 | 6 | 6.6 | 3.2 |
| Example 114 | — | Resin 6 | 240 | 2.5 | Acryl | NEOCRYL A-6092 | 33 | 6 | 8 | 2.8 |
| Example 115 | — | Resin 4 | 120 | 2.5 | Acryl | NEOCRYL A-1105 | 10 | 6 | 3.6 | 3.2 |
| Example 116 | — | Resin 4 | 120 | 2.5 | Acryl | NEOCRYL A-6092 | 33 | 6 | 5 | 2.8 |
| Example 117 | — | Resin 4 | 120 | 2.5 | Acryl | NEOCRYL A-1091 | 62 | 6 | 6.7 | 3.6 |
| Example 118 | — | Resin 4 | 120 | 2.5 | Acryl | NEOCRYL A-1105 | 10 | 6 | 3.6 | 3.2 |
| Example 119 | — | Resin 4 | 120 | 2.5 | Acryl | NEOCRYL A-6092 | 33 | 6 | 5 | 2.8 |
| Example 120 | — | Resin 4 | 120 | 2.5 | Acryl | NEOCRYL A-1091 | 62 | 6 | 6.7 | 3.6 |
| Example 121 | 3 | Resin 4 | 120 | 2.5 | Acryl | NEOCRYL A-1105 | 10 | 6 | 3.6 | 3.3 |
| Example 122 | 3 | Resin 4 | 120 | 3.5 | Acryl | NEOCRYL XK-12 | 11 | 6 | 3.7 | 2.6 |

| | First ink | | | | | | | | |
|---|---|---|---|---|---|---|---|---|---|
| | Dispersing resin | | | Additive resin | | | | | |
| | Type | Acid value | Content (% by mass) | Type | Product name | Acid value | Content (% by mass) | Acid value A1 of ink | Elastic modulus B1 |
| Example 101 | Resin 1 | 200 | 1.5 | Acryl | NEOCRYL A-1105 | 10 | 4 | 3.4 | 3.5 |
| Example 102 | Resin 1 | 200 | 1.5 | Acryl | NEOCRYL A-1105 | 10 | 1 | 3.4 | 3.5 |
| Example 103 | Resin 1 | 200 | 1.5 | Acryl | NEOCRYL A-1105 | 10 | 4 | 3.4 | 3.5 |
| Example 104 | Resin 1 | 200 | 1.5 | Acryl | NEOCRYL A-1105 | 10 | 4 | 3.4 | 3.5 |
| Example 105 | Resin 1 | 200 | 1.5 | Acryl | NEOCRYL A-1105 | 10 | 4 | 3.4 | 3.5 |
| Example 106 | Resin 1 | 200 | 1.5 | Acryl | NEOCRYL A-1105 | 10 | 4 | 3.4 | 3.5 |
| Example 107 | Resin 1 | 200 | 1.5 | Acryl | NEOCRYL A-1105 | 10 | 4 | 3.4 | 3.5 |
| Example 108 | Resin 1 | 200 | 1.5 | Acryl | NEOCRYL A-3127 | 18 | 4 | 3.7 | 2.4 |
| Example 109 | Resin 1 | 200 | 1.5 | Acryl | NEOCRYL A-6092 | 33 | 4 | 4.3 | 3.4 |
| Example 110 | Resin 1 | 200 | 1.5 | Acryl | NEOCRYL A-3091 | 62 | 4 | 5.5 | 4.2 |
| Example 111 | Resin 1 | 200 | 1.5 | Acryl | NEOCRYL A-1105 | 10 | 4 | 3.4 | 3.5 |
| Example 112 | Resin 1 | 200 | 1.5 | Acryl | NEOCRYL A-6092 | 33 | 4 | 4.3 | 3.4 |
| Example 113 | Resin 1 | 200 | 1.5 | Acryl | NEOCRYL A-1105 | 10 | 4 | 3.4 | 3.5 |
| Example 114 | Resin 1 | 200 | 1.5 | Acryl | NEOCRYL A-6092 | 33 | 4 | 4.3 | 3.4 |
| Example 115 | Resin 2 | 150 | 1.5 | Acryl | NEOCRYL A-1105 | 10 | 4 | 2.7 | 3.5 |
| Example 116 | Resin 2 | 150 | 1.5 | Acryl | NEOCRYL A-6092 | 33 | 4 | 3.6 | 3.4 |
| Example 117 | Resin 2 | 150 | 1.5 | Acryl | NEOCRYL A-1091 | 62 | 4 | 4.7 | 4.2 |
| Example 138 | Resin 3 | 250 | 1.5 | Acryl | NEOCRYL A-3105 | 10 | 4 | 4.2 | 3.5 |

TABLE 2-continued

| | | | | | | | | | |
|---|---|---|---|---|---|---|---|---|---|
| Example 139 | Resin 3 | 250 | 1.5 | Acryl | NEOCRYL A-6092 | 33 | 4 | 5.1 | 3.4 |
| Example 120 | Resin 3 | 250 | 1.5 | Acryl | NEOCRYL A-1091 | 62 | 4 | 6.2 | 4.2 |
| Example 121 | Resin 1 | 200 | 1.5 | Acryl | NEOCRYL A-1105 | 10 | 4 | 3.4 | 3.5 |
| Example 122 | Resin 1 | 200 | 1.5 | Acryl | NEOCRYL A-1105 | 10 | 4 | 3.4 | 3.5 |

| | Acid value | Elastic modulus | Elastic modulus | Evaluation | |
|---|---|---|---|---|---|
| | A1-A2 | B2-B1 | B2-B3 | Lamination strength | Character quality |
| Example 101 | −0.2 | 0.2 | — | 6 | 3 |
| Example 102 | −0.3 | 0.9 | — | 6 | 3 |
| Example 103 | −0.7 | 1.3 | — | 5 | 3 |
| Example 104 | −1.6 | 0.5 | — | 6 | 3 |
| Example 105 | −3.3 | −0.2 | — | 4 | 3 |
| Example 106 | −0.1 | −0.7 | — | 6 | 3 |
| Example 107 | −0.9 | 1.5 | — | 5 | 3 |
| Example 108 | −0.4 | 0.2 | — | 4 | 3 |
| Example 109 | −0.7 | 0.4 | — | 5 | 3 |
| Example 110 | −1.2 | 0.5 | — | 4 | 3 |
| Example 111 | −1.7 | 0.3 | — | 5 | 3 |
| Example 112 | −2.2 | 0.6 | — | 3 | 3 |
| Example 113 | −3.2 | 0.3 | — | 4 | 3 |
| Example 114 | −3.7 | 0.6 | — | 3 | 3 |
| Example 115 | −1 | 0.3 | — | 6 | 3 |
| Example 116 | −1.4 | 0.6 | — | 6 | 3 |
| Example 117 | −2 | 0.6 | — | 4 | 3 |
| Example 118 | 0.6 | 0.3 | — | 5 | 3 |
| Example 119 | 0.1 | 0.6 | — | 5 | 3 |
| Example 120 | −0.5 | 0.6 | — | 4 | 3 |
| Example 121 | −0.2 | 0.2 | 0.3 | 6 | 5 |
| Example 122 | −0.3 | 0.9 | −0.4 | 5 | 5 |

As listed in Table 2, it was found that in Examples 101 to 122, since the first ink containing water, a white pigment, and at least two kinds of resins and the second ink containing water, a pigment other than the white pigment, and a resin were prepared and the acid value of the first ink was 8 mgKOH/g or less, the lamination strength was high.

It was found that in Example 121 and Example 122, since the pretreatment liquid was further prepared, the character quality was excellent. In particular, it was found that in Example 121, since the elastic modulus of the pretreatment liquid film formed by solidifying the pretreatment liquid was less than the elastic modulus of the ink film formed by solidifying the second ink, the character quality was excellent and the lamination strength was high.

EXPLANATION OF REFERENCES

11, 12: horizontal line in character

What is claimed is:

1. An ink jet ink comprising:
water;
a white pigment; and
at least two kinds of resins,
wherein the ink jet ink has an acid value of 8.0 mgKOH/g or less, and
the ink jet ink contains a dispersion resin, and an acid value of the dispersion resin is 100 mgKOH/g to 300 mgKOH/g.

2. The ink jet ink according to claim 1,
wherein the ink jet ink has an acid value of 1.5 mgKOH/g to 4.0 mgKOH/g.

3. The ink jet ink according to claim 1,
wherein an ink film formed by solidifying the ink jet ink has an elastic modulus of 2.5 GPa to 5.0 GPa.

4. The ink jet ink according to claim 1,
wherein at least one resin of the at least two kinds of resins has an acid value of 40 mgKOH/g or less.

5. The ink jet ink according to claim 1,
wherein at least one resin of the at least two kinds of resins is present as resin particles.

6. The ink jet ink according to claim 5,
wherein a content of the resin particles is in a range of 3% by mass to 8% by mass with respect to a total amount of the ink jet ink.

7. An ink set comprising:
a first ink which is the ink jet ink according to claim 1; and
a second ink which is an ink jet ink comprising water, a pigment other than a white pigment, and a resin.

8. The ink set according to claim 7,
wherein the second ink has an acid value of 8.0 mgKOH/g or less.

9. The ink set according to claim 7,
wherein the second ink has an acid value of 1.0 mgKOH/g to 5.0 mgKOH/g.

10. The ink set according to claim 7,
wherein an absolute value of a difference between the acid value of the first ink and an acid value of the second ink is 2.0 mgKOH/g or less.

11. The ink set according to claim 7,
wherein an ink film formed by solidifying the second ink has an elastic modulus of 2.5 GPa to 5.0 GPa.

12. The ink set according to claim 7, further comprising:
a pretreatment liquid comprising water and a resin.

13. The ink set according to claim 12,
wherein an elastic modulus of a pretreatment liquid film formed by solidifying the pretreatment liquid is the same as or less than an elastic modulus of the ink film formed by solidifying the second ink.

14. An image recording method using the ink jet ink according to claim 1, the method comprising:
applying the ink jet ink onto a base material using an ink jet recording method.

15. An image recording method using the ink set according to claim 7, the method comprising:
applying the first ink and the second ink onto a base material using an ink jet recording method.

16. An image recording method using the ink set according to claim 12, the method comprising:

applying the pretreatment liquid onto a base material; and applying the first ink and the second ink onto the base material onto which the pretreatment liquid has been applied, using an ink jet recording method.

17. A method of producing a laminate comprising:

obtaining an image recorded material which includes the base material and an image disposed on the base material using the image recording method according to claim 14; and laminating a base material for lamination on a side of the image recorded material where the image is disposed to obtain a laminate.

* * * * *